US007347658B2

(12) United States Patent
Schlangen

(10) Patent No.: US 7,347,658 B2
(45) Date of Patent: Mar. 25, 2008

(54) LIFT AND TRANSPORT APPARATUS

(76) Inventor: Phillip E. Schlangen, 1920 S. First St., Apartment 1601, Minneapolis, MN (US) 55454

( * ) Notice: Subject to any disclaimer, the term of this patent is extended or adjusted under 35 U.S.C. 154(b) by 0 days.

(21) Appl. No.: 11/582,899

(22) Filed: Oct. 19, 2006

(65) Prior Publication Data
US 2007/0059136 A1 Mar. 15, 2007

Related U.S. Application Data

(62) Division of application No. 10/783,116, filed on Feb. 20, 2004, now Pat. No. 7,284,944.

(60) Provisional application No. 60/524,305, filed on Nov. 24, 2003.

(51) Int. Cl.
A65G 3/02 (2006.01)
(52) U.S. Cl. ...................... 414/541; 414/921
(58) Field of Classification Search ............... 414/497, 414/541, 540, 684.3, 921; 296/146.4
See application file for complete search history.

(56) References Cited

U.S. PATENT DOCUMENTS

| 4,353,436 A | * | 10/1982 | Rice et al. | 414/540 |
|---|---|---|---|---|
| 4,483,653 A | * | 11/1984 | Waite | 414/541 |
| 4,664,584 A | * | 5/1987 | Braun et al. | 414/541 |
| 4,725,188 A | * | 2/1988 | Zimmermann et al. | 414/678 |
| 5,421,692 A | * | 6/1995 | Varrichio et al. | 414/678 |
| 5,466,111 A | * | 11/1995 | Meyer | 414/462 |
| 5,540,539 A | * | 7/1996 | Wolfman et al. | 414/541 |
| 5,577,793 A | * | 11/1996 | Kobasic | 296/146.4 |
| 5,913,559 A | * | 6/1999 | Sexton et al. | 296/20 |
| 6,042,330 A | * | 3/2000 | Egan | 414/680 |
| 6,071,064 A | * | 6/2000 | Hackett | 414/545 |
| 6,352,396 B1 | * | 3/2002 | Budd et al. | 410/8 |
| 6,478,529 B1 | * | 11/2002 | Willey et al. | 414/678 |
| 6,595,738 B2 | * | 7/2003 | Rock et al. | 414/541 |
| 6,726,435 B1 | * | 4/2004 | Williams et al. | 414/542 |
| 6,793,269 B2 | * | 9/2004 | Pugh et al. | 296/146.9 |
| 2004/0022614 A1 | * | 2/2004 | Anderson | 414/540 |
| 2005/0105995 A1 | * | 5/2005 | Freet et al. | 414/541 |
| 2007/0207020 A1 | * | 9/2007 | Samuels et al. | 414/537 |

FOREIGN PATENT DOCUMENTS

JP 57186542 A * 11/1982

* cited by examiner

Primary Examiner—Saul Rodriguez
Assistant Examiner—Charles Greenhut
(74) Attorney, Agent, or Firm—Richard O. Bartz

(57) ABSTRACT

A wheelchair lift and lateral transport apparatus has a lift assembly operable to elevate a platform supporting a wheelchair from a first ground position to a second elevated position adjacent a side of a motor vehicle. A headrest is mounted on the upper end of the lift assembly. A lateral transport assembly mounted on the vehicle floor and secured to the lift assembly operates to move the lift assembly and wheelchair on the platform from the second position to a third position. The lift assembly lowers the platform from the third position onto anchor pins secured to the floor of the vehicle to locate the person in the wheelchair in the vehicle driver's position.

24 Claims, 28 Drawing Sheets

LIFT AND TRANSPORT APPARATUS

CROSS REFERENCE TO RELATED APPLICATION

This application is a division of U.S. application Ser. No. 10/783,116 filed Feb. 20, 2004. Application Ser. No. 10/783,116 claims the benefit of U.S. Provisional Application Ser. No. 60/524,305 filed Nov. 24, 2003.

FIELD OF THE INVENTION

The present invention relates to an apparatus operable to lift an object from a first location to a second location and transport the object from the second location to a third location. More particularly, the apparatus is a wheelchair lift for loading and unloading a wheelchair from a motor vehicle.

BACKGROUND OF THE INVENTION

Wheelchair lifts mounted on vehicles, such as buses, vans, motor homes and automobiles, provide wheelchair users access to the interior of the vehicles thereby increasing their mobility and enabling these people to become more self-reliant and independent. Wheelchair lifts have generally horizontal platforms which are used to support manual and motor driven wheelchairs along with persons located on the wheelchairs. Lift structures connected to the platforms operate to selectively raise and lower the platforms. When the platforms are in the lower or ground positions the wheelchairs are moved onto the platforms. The platforms are raised by the lift structures to a selected elevation, such as the floor of the vehicle, and then moved off the platform into the interior compartment of the vehicle. Actuators, such as electric motors, operating screws and hydraulic cylinders, are used to move the platforms to transport positions within the confines of the vehicle. The wheelchair is secured to the vehicle floor to prevent inadvertent movement of the wheelchair within the vehicle. In some vehicles, the wheelchair is moved to a vehicle operator position and anchored thereto to allow the wheelchair user to operate the vehicle. Examples of wheelchair lifts are disclosed in the following U.S. Patents.

R. W. Braun et al in U.S. Pat. No. 4,664,584 describes a rotary wheelchair lift having a platform vertically moveable with a hydraulic lift. A linear actuator operates to rotate the platform and the hydraulic lift to a position inside the passenger compartment of the vehicle.

C. L. Wolfe in U.S. Pat. No. 5,052,879 discloses a wheelchair lift operable by a person in a wheelchair to elevate and move the wheelchair from a ground position to a motor vehicle driver position without leaving the wheelchair. The lift has a frame and horizontal platform for supporting a wheelchair adjacent the driver's side of a motor vehicle. Seven actuators including a first pair of piston and cylinder units secured to the frame operate to raise the frame and platform to the level of the floor of the vehicle and move the platform to the vehicle driving position. The platform supporting the wheelchair is laterally moved from the frame onto a pair of tracks secured to the floor of the vehicle. The pair of piston and cylinder units used to lift the platform limits foot clearance during lateral movement of the platform. A motor driven endless chain on the platform operates to transfer the platform to and from the tracks. When the platform is mounted on the tracks, the wheelchair is the vehicle driving position. The tracks are U-shaped members secured directly to the vehicle's floor. The platform supporting the wheelchair is located above the tracks. Snow, water, mud and dirt can accumulate and freeze in the tracks causing the lift to jam. The tracks and platform are not vertically adjustable to accommodate short and tall persons. A ramp pivotally connected to the platform facilitates the movement of the wheelchair onto and off of the platform. The ramp and platform fold to upright positions which limits the space on the platform for the wheelchair and provides a rear support behind the wheelchair. All of the piston and cylinder units and motor for the endless chain are controlled with a control box mounted on one side of the platform.

J. E. Crain et al in U.S. Pat. No. 5,308,214 discloses a wheelchair lift apparatus having a wheelchair support platform moveable to a position adjacent the outside of the driver's seat of a motor vehicle to allow a person to move out of the wheelchair into the driver's seat. The platform is vertically moveable to lift the wheelchair from a ground position to an up position and then swing the platform behind the driver's seat. A horizontal motor driven screw laterally moves the platform into the rear passenger compartment of the vehicle.

R. X. Meyer in U.S. Pat. No. 5,466,111 discloses an apparatus and method for loading a wheelchair into a vehicle driving position. The wheelchair is attached to the open door of the vehicle. The wheelchair vertical lift is used to lift the wheelchair off the ground to allow the door to close and position the wheelchair in the vehicle driving position. A locking mechanism is used to secure the wheelchair in the driving position.

D. L. Jones et al discloses in U.S. Pat. No. 5,746,465 an apparatus operable to move a person on a seat through a vehicle driven side door to a driving position of a motor vehicle. The seat is pivotally mounted on a portion of the vehicle's frame. The seat is vertically and horizontally moveable with motor driven screws to position the person in a convenient location behind the vehicle's steering wheel.

D. L. Mortimore in U.S. Patent Application Publication 2001/0026756 discloses a lift operable to elevate and laterally move a person transport vehicle from a ground position to the floor level of a motor vehicle, such as a van. The lift has tracks secured to the floor of the van supporting a plate. A first actuator connected to the plate causes the plate to reciprocate along the tracks. A lift assembly having parallel linkages is secured to the plate. A second actuator operates the lift assembly to raise and lower a platform for supporting a person transport vehicle. When the platform is in the raised position, the first actuator is operated to laterally move the folded parallel linkages and platform supporting the person transport vehicle into the van.

SUMMARY OF THE INVENTION

The invention is an object lifting and transporting apparatus operable to raise an object from a first location, such as the ground, to a second location generally above the first location and transport the object from the second location to a third location. The apparatus also operates to reverse the object lifting and transporting sequence to move an object from the third location back to the first location. The apparatus comprises a lift assembly connected to a platform for supporting an object, such as a wheelchair or a bucket seat for accommodating a person. The lift assembly has an upright first member and a second member telescoped within the first member. The platform is attached to the second member. A first linear actuator connected to the first and second members operates to raise and lower the second member and platform from a ground first position to an elevated second position generally above the first position. A lateral transport assembly mounted on a support, such as the floor of a motor vehicle, has a first beam and a second beam mounted on the first beam for movement between extended and contracted horizontal positions. The second beam is secured to the first member of the lift assembly. A second linear actuator connected to the first and second beams operates to laterally move the second beam, platform and wheelchair from the second location to a third location laterally of the second location. The platform supporting the wheelchair is then lowered with the lift assembly to a fourth position into holding engagement with restrainers, such as upright anchor pins, mounted on the support. The fourth position is a selected location on a support, such as the floor of a motor vehicle, van, and motor home. The support includes floors and support surfaces of buildings and walkways.

The lift and transport apparatus of the invention operates to move a wheelchair and a person seated on the wheelchair from a ground position adjacent a side of a motor vehicle to a vehicle driver's position and retain the wheelchair in the vehicle driver's position. The lift and transport apparatus is operable to transport a wheelchair into the passenger side as well as the back seat and rear areas of a motor vehicle. The motor vehicle includes, but is not limited to, automobiles, vans, trucks, and motor homes. Other types of vehicles, such as a travel trailers, tent trailers, fifth wheel trailers and campers can be equipped with the lift and transport apparatus of the invention. The apparatus has a lift assembly connected to a horizontal flat platform for supporting a wheelchair. An example of a motor driven wheelchair is disclosed by P. E. Schlangen in U.S. Pat. No. 6,375,209. A manual drive wheelchair is disclosed by P. E. Schlangen in U.S. Pat. No. Des. 427,949. The lift assembly is used to selectively raise and lower the wheelchair between a ground first position and an elevated second position. The lift assembly comprises an upright first tubular member and a second tubular member telescoped within the first tubular member and extended downwardly from the lower end of the first tubular member. The lower end of the second member is secured to a wheelchair coupling member attached to the top of the platform. A first linear actuator connected to the first and second tubular members is operational to raise and lower the platform between a ground first position to an elevated second position. The linear actuator can be a motor driven elongated screw, chain, rack and gear or an elongated fluid operated piston and cylinder assembly. The linear actuator can be located within the tubular members or mounted externally on the tubular members. Controls having manual switches used by the person in the wheelchair control the operation of the motor to extend and contract the linear actuator. A headrest assembly is mounted on top of the first tubular member. The headrest assembly has upright pads attached to support members that horizontally and vertically adjust the position of the pads and retain the pads in adjusted positions behind the wheelchair on the platform. A side door of the vehicle is connected to the first tubular member. A lateral transport assembly operates to move the lift assembly, platform supporting the wheelchair and vehicle door from an open second position to a third position locating the platform and wheelchair within the vehicle behind the steering wheel of the vehicle. The lift assembly is actuated to lower the platform onto anchor pins secured to the floor of the vehicle thereby positioning the wheelchair in the vehicle driver's location adjacent the steering wheel. Anchor pins are vertically adjustable relative to the vehicle's floor whereby the vertical location of the platform and wheelchair on the platform can be changed to accommodate short and tall persons and different types of wheelchairs. A stop arm secured to a side wall of the vehicle is engaged with a wheel of the wheelchair to fix the position of the wheelchair in the vehicle when the platform rests on the anchor pins. The lateral transport assembly has a stationary first box beam secured to the floor of the vehicle. A second box beam telescopes into the first box beam and extends laterally to the lift assembly. The second box beam is secured to the first tubular member of the list assembly. A second linear actuator connected to the first and second box beams operates to move the second box beam between extended and contracted positions relative to the first box beam thereby laterally moving the lift apparatus, platform, and wheelchair supporting a person between the elevated second position and a third position within the vehicle. The second linear actuator can be a motor driven elongated screw, chain, rack and gear or an elongated fluid operated piston and cylinder assembly. Second linear actuator can be located within the first and second box beams or mounted externally on the box beams. Controls having manual switches used by a person on the wheelchair control the operation of the motor that drives the linear actuator that laterally moves the second box beam, lift assembly, platform supporting the wheelchair and vehicle door. The controls for the first and second linear actuators are located in positions accessible by the person in the wheelchair. The controls can be mounted on the inside of the vehicle door or a support attached to the platform.

DESCRIPTION OF PREFERRED EMBODIMENTS OF LIFT APPARATUS

Figure 18:
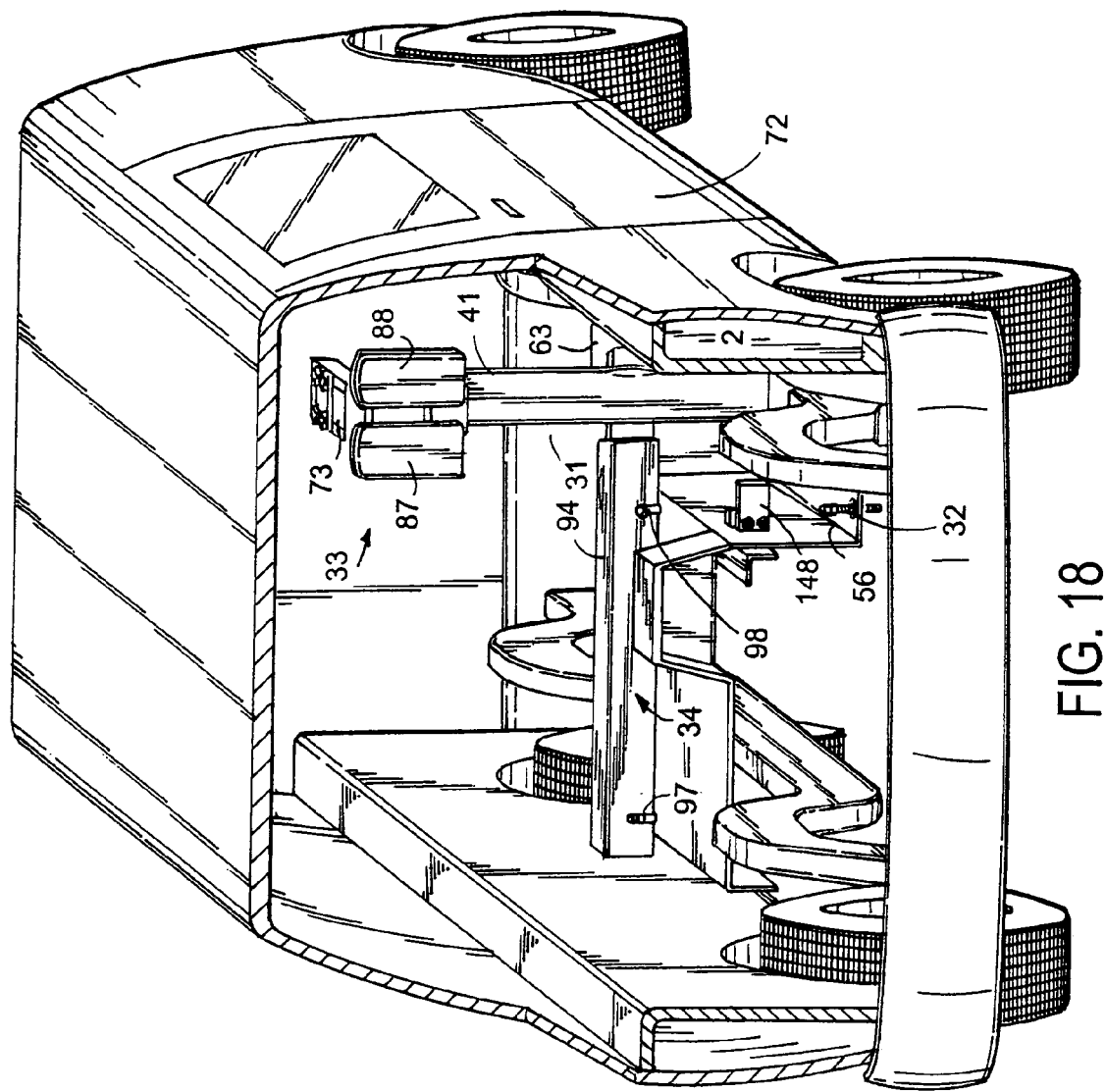
FIG. 18 is a perspective view, partly sectioned, of a motor vehicle equipped with the apparatus of FIG. 8.

The object lift and transport apparatus 30 is herein described as used to raise a wheelchair and person thereon and laterally move the wheelchair to a selected location and reverse the movement of the wheelchair from the selected location back to the original location. Apparatus 30 has general utility for lifting an object, product or container from a first location, such as the ground or street, to a second location generally above the first location and laterally transport the object from the second location to the third location and reverse the movement of the object from the third location back to the first location. The lift and transport apparatus 30 described herein is used to vertically lift a wheelchair supporting a person and laterally move the wheelchair directly behind a motor vehicle's steering wheel. The wheelchair is locked down in a position that allows the person in the wheelchair to operate the vehicle as shown in FIG. 18. Lift and transport apparatus 30 can be adapted to lift and transport a wheelchair into the passenger side, back seat and rear areas of motor vehicles and non-motor vehicles.

The wheelchair lift and transport assembly 30, shown in FIGS. 1 to 7, has an upright lift assembly 31 attached at its lower end to a horizontal platform 32. A headrest 33 is mounted on the upper end of the lift assembly 31. A lateral transport assembly 34 secured to the floor of the vehicle connected to lift apparatus 31 operates to laterally move lift assembly 31, platform 32, wheelchair on the platform and headrest 33 into the driver's compartment of the vehicle above vehicle floor 35. A plurality of upright anchor pins 36, 37, 38, and 39 secured to floor 35 anchor platform 32 on floor 35 and remove the weight of the wheelchair and person on the wheelchair from lift and transport assemblies 31 and 34. Anchor pins 36-39 and nuts thread on the pins are vertically adjustable to change the vertical location of platform 32 relative to floor 35 and adjacent the incline or slope of platform 32 anchored on pins 36-39. These adjustments accommodate short and tall persons and allow use of different types of wheelchairs.

Figure 4:
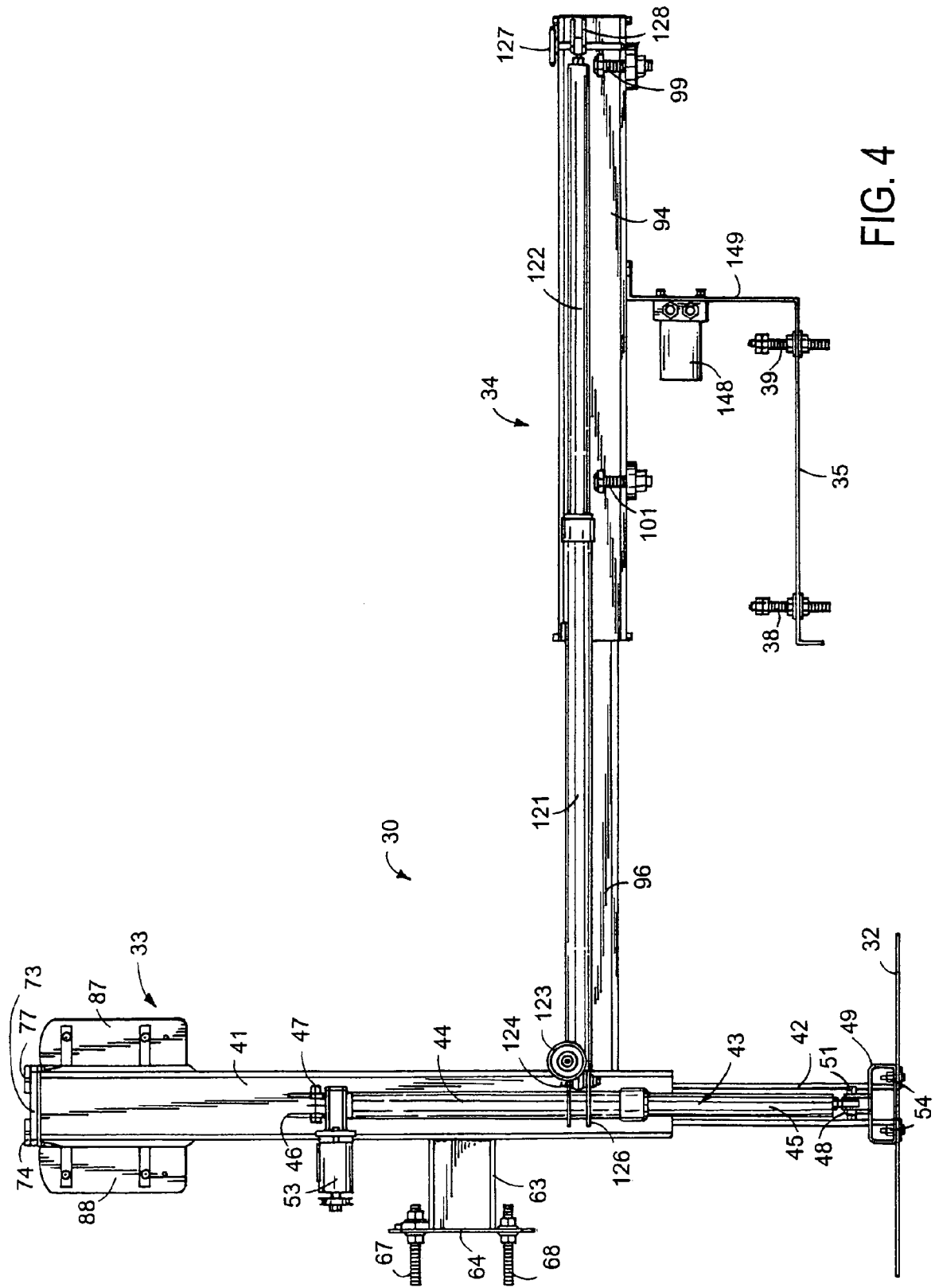
FIG. 4 is a rear elevational view of the apparatus of FIG. 1.
Figure 5:
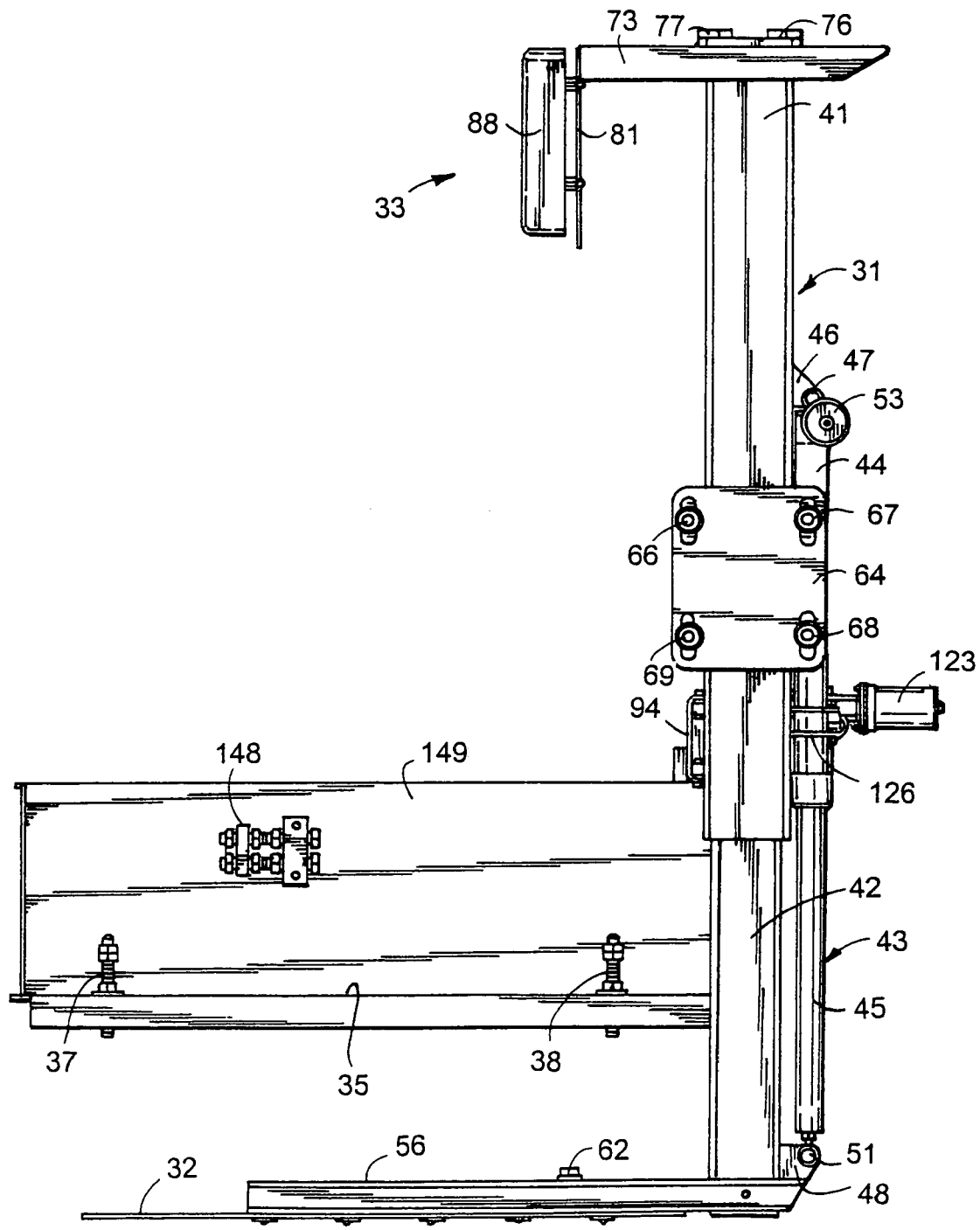
FIG. 5 is a side elevational view of the right side of the apparatus of FIG. 1.
Figure 6:
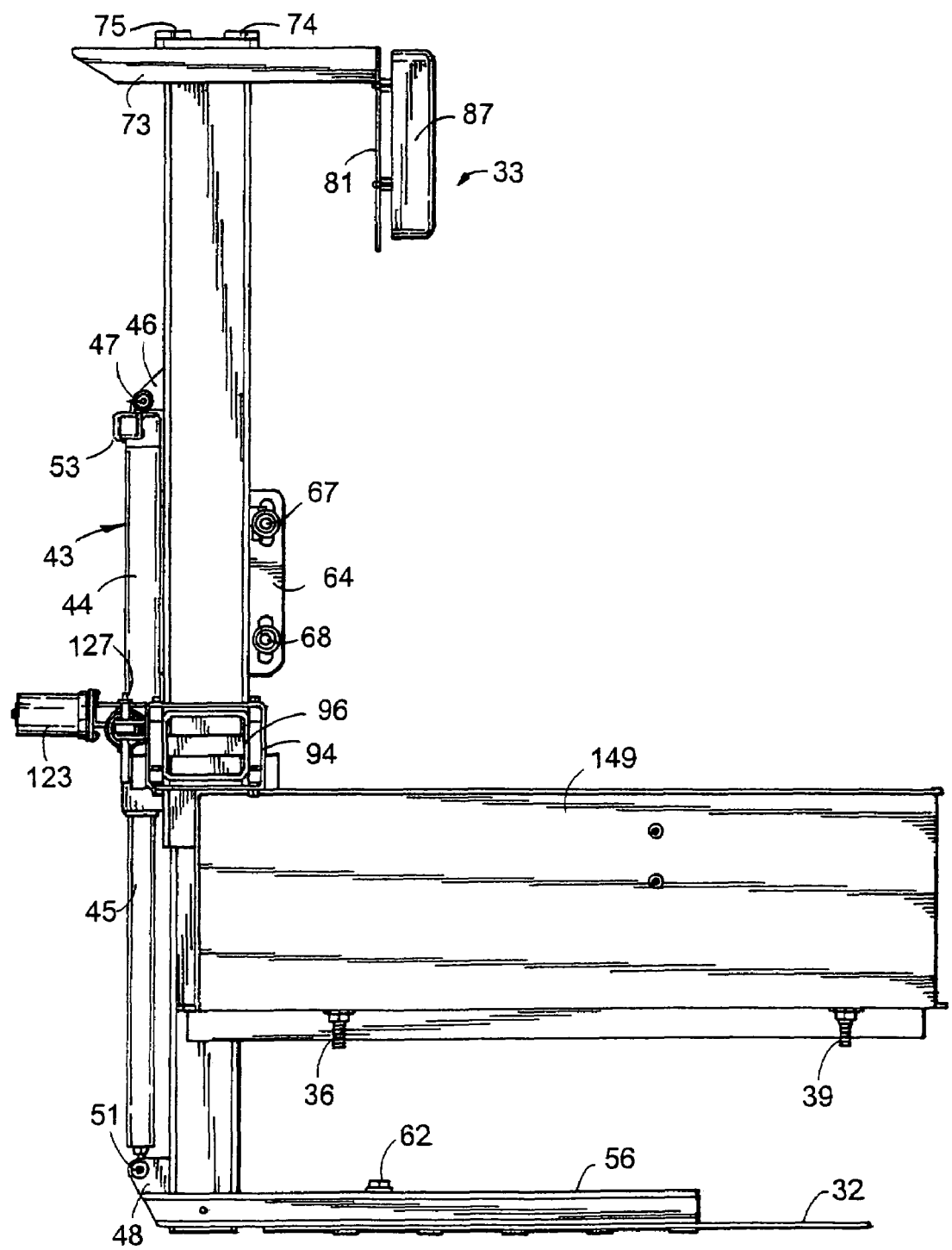
FIG. 6 is a side elevational view of the left side of the apparatus of FIG. 1.
Figure 7:
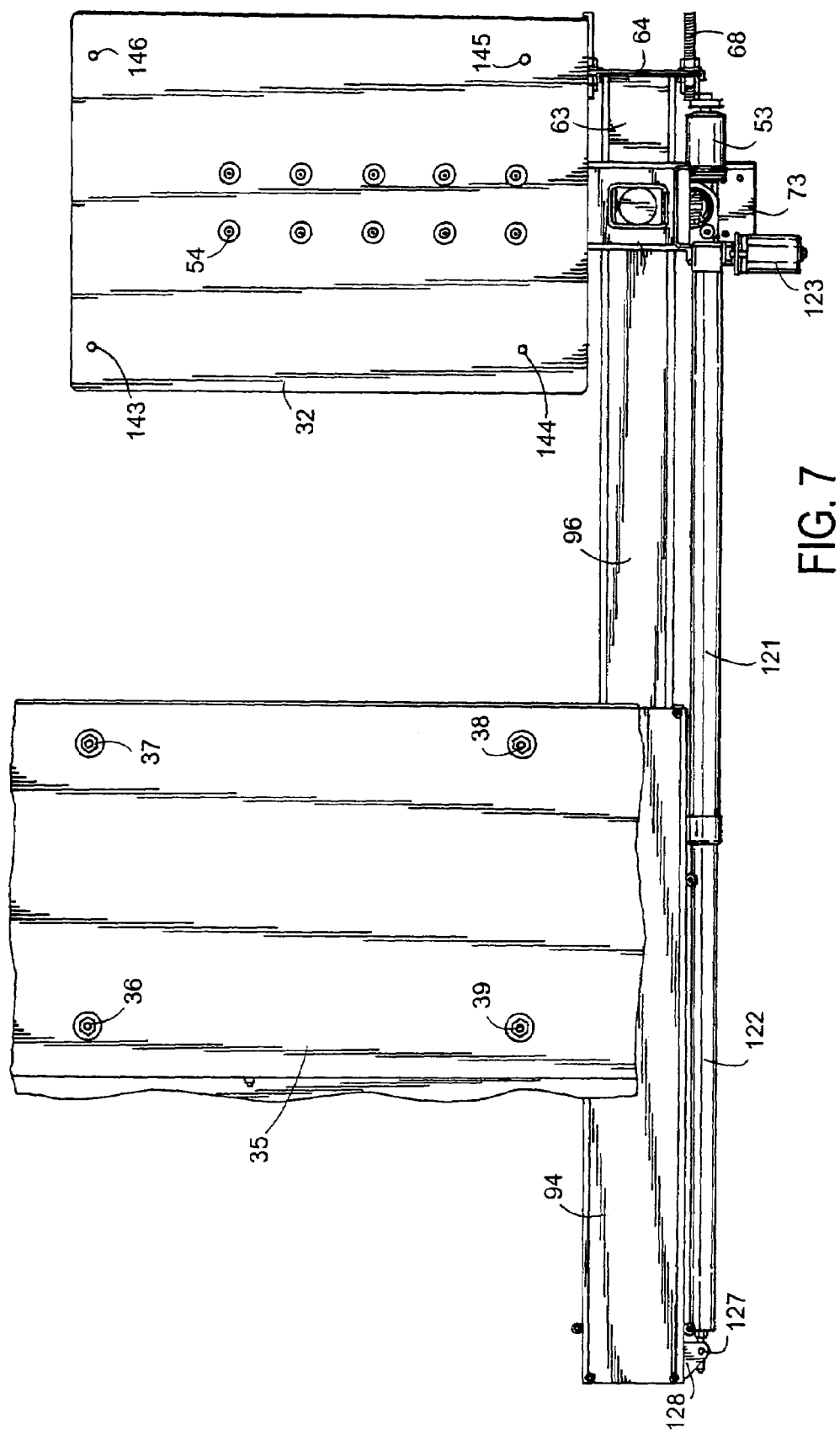
FIG. 7 is a bottom plan view of the apparatus of FIG. 1.

Lift assembly 31 has a first upright tubular member 41 and a second tubular member 42 telescoped into the tubular member 41 and extended downwardly from the lower end of member 41. A first linear actuator 43 operates to selectively raise and lower tubular member 41 and platform 32. As shown in FIG. 4, actuator 43 has an elongated cylinder 44 accommodating a cylindrical piston 45. Actuators having elongated screws, racks and gears and chains can be used as actuator 48. Other types of linear actuators including hydraulic and air cylinders can be used as actuator 48. A pair of brackets 46 secured to the back of tubular member 41 and member 49 holds a pin 47 connecting the upper end of cylinder 44 to tubular member 41. The lower end of piston 45 is located between brackets 48. A transverse pin 51 connects the lower end of piston 45 to brackets 49. A reversible electric motor 53 mounted on the upper end of cylinder 44 operates to drive actuator 48 to raise and lower platform 32. Motor 53 has a brake and hand lever used to set the brake and lock up actuator 43. Fluid operated motors can be used to operate linear actuator 43.

Wheelchair coupling member 49 has an elongated box shape having a bottom 52 secured to platform 32 with a plurality of bolts 54. The top wall 56 has inwardly tapered inside edges 57 and 58 extended from the front end of member 49 to an elongated linear slot 59. Edges 52 and 58 on opposite sides of a V-shaped mouth 61 leading to linear slot 59 provide guides for directing a wheelchair retainer in slot 49. A stop blot 62 extended through slot 59 and secured to top wall 56 limits rearward movement of the wheelchair on platform 32. The position of stop bolt 62 along the length of slot 59 is adjustable to change the stop location of the wheelchair on platform 32 and accommodate different wheelchair designs.

Figure 20:
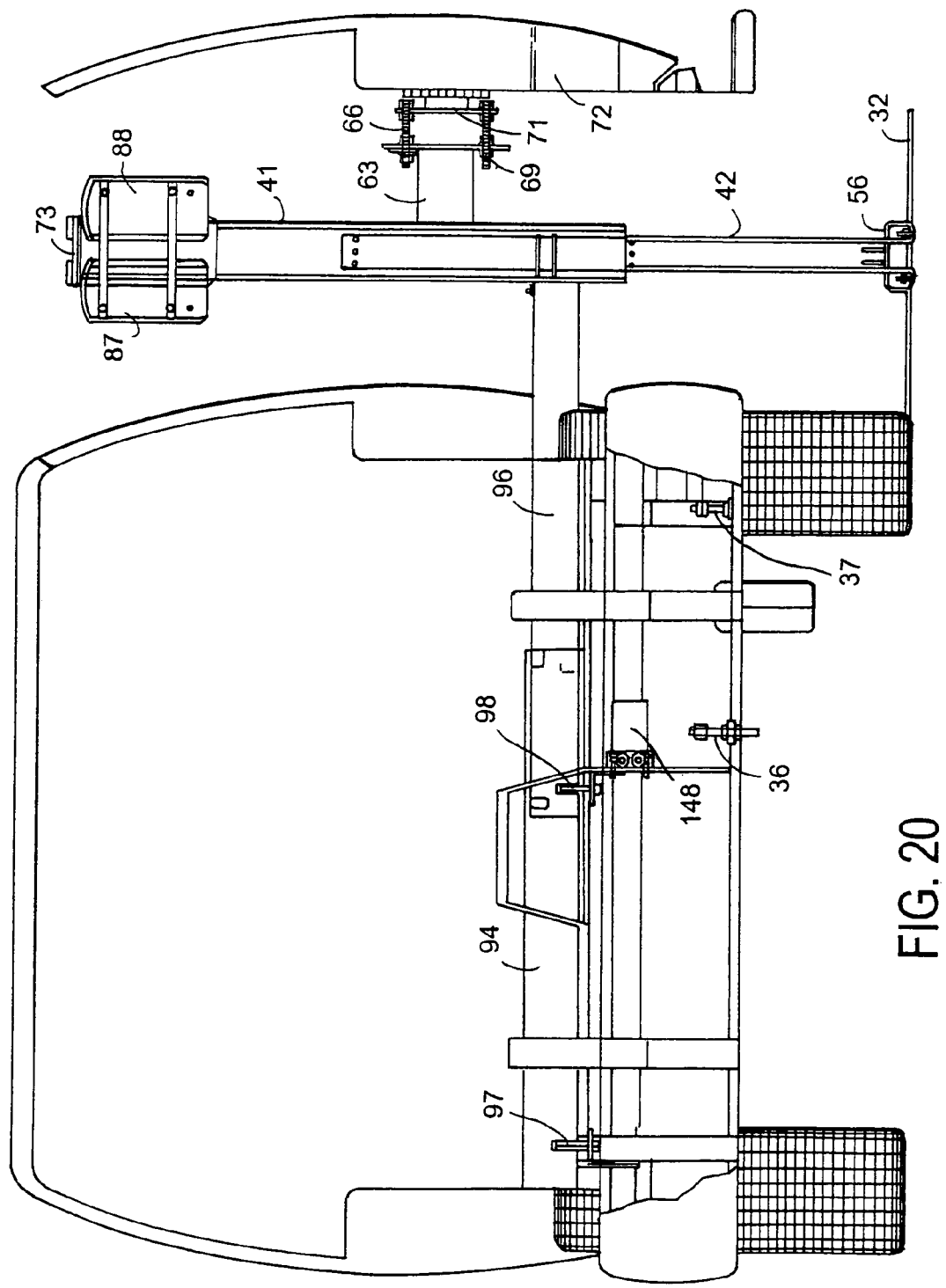
FIG. 20 is a front elevational view of FIG. 18 showing the apparatus in the expanded position.
Figure 21:
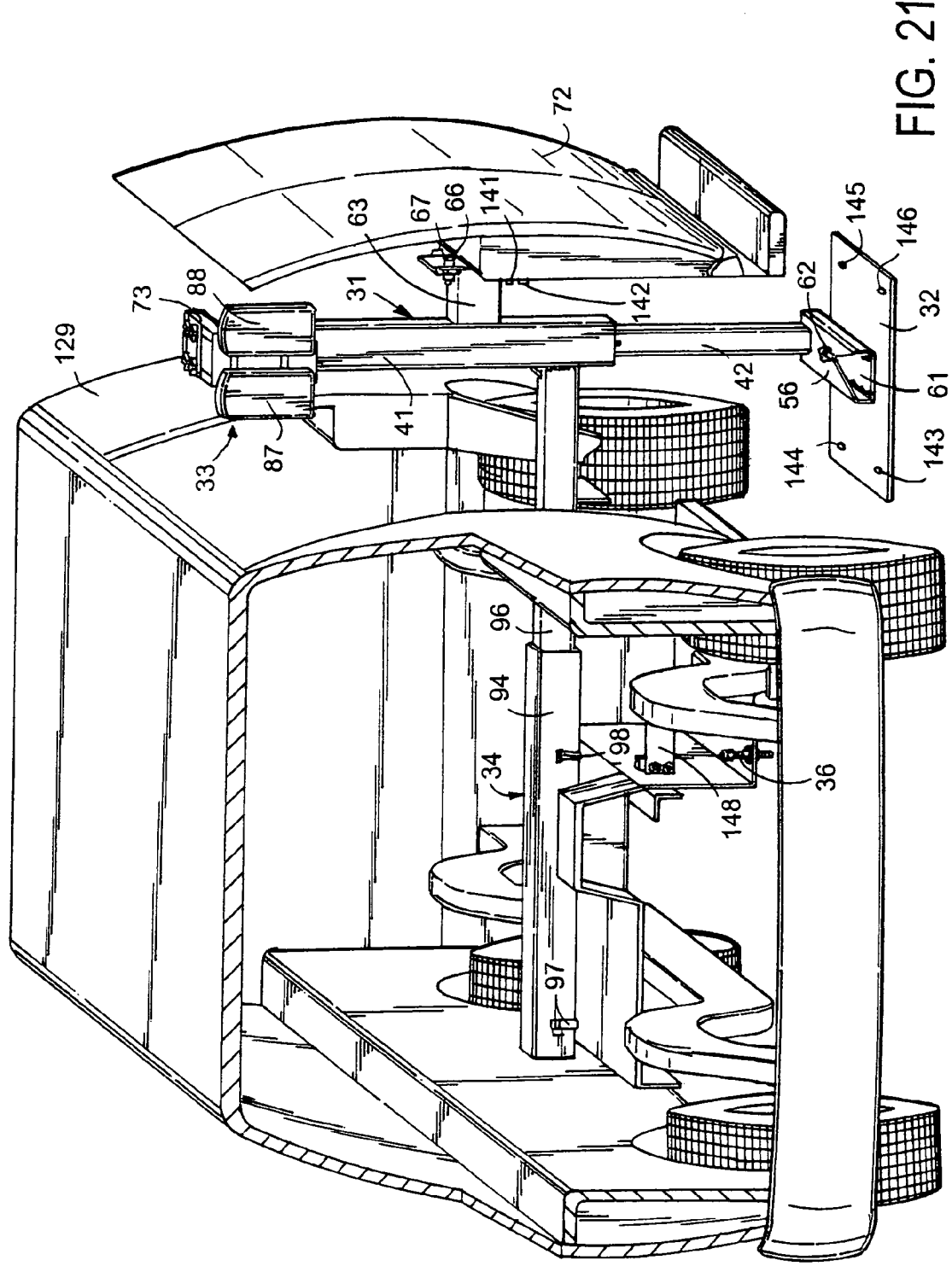
FIG. 21 is a perspective view, partly sectioned, of a motor vehicle equipped with the apparatus of FIG. 8 in the expanded position.
Figure 22:
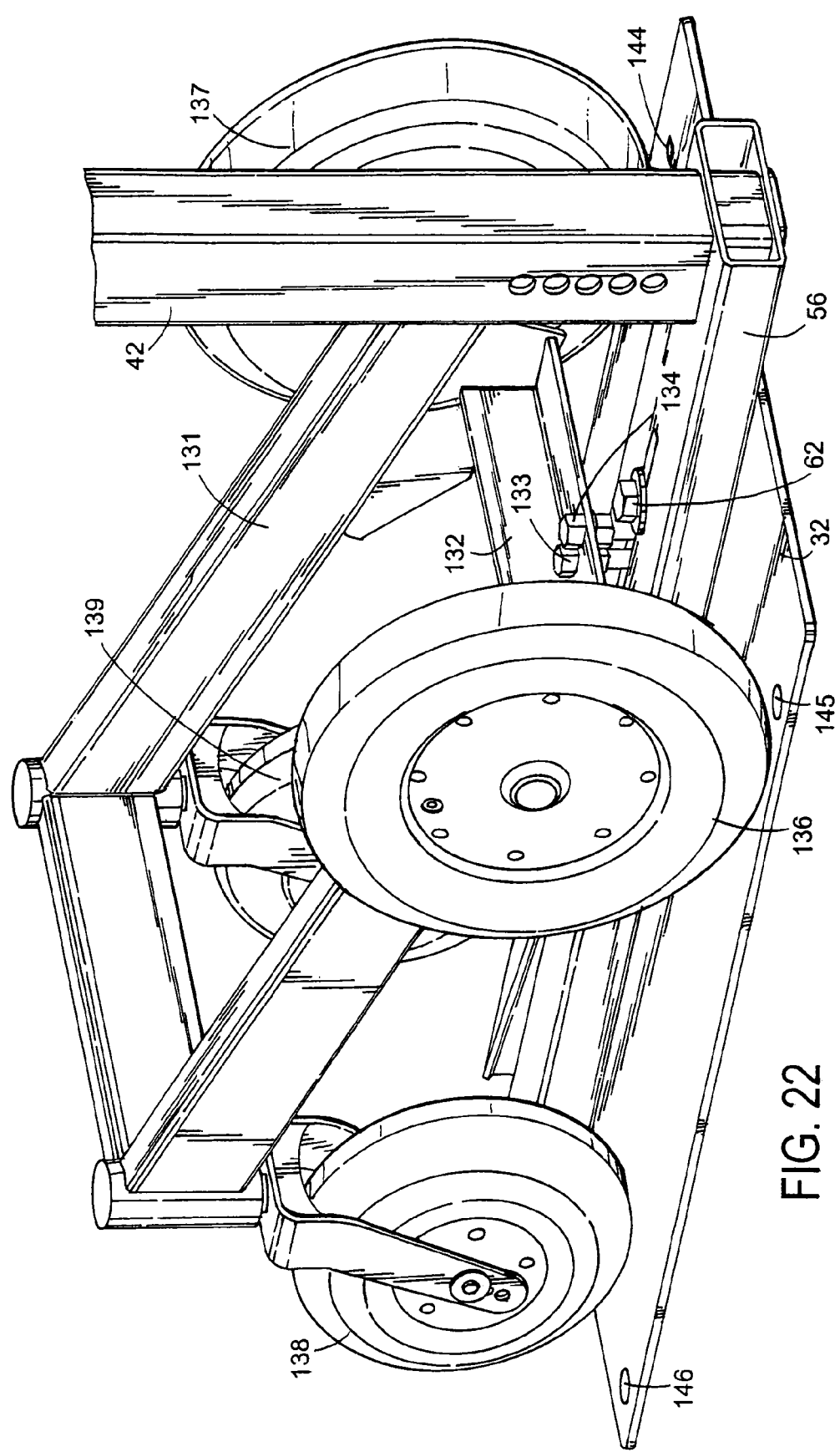
FIG. 22 is a perspective view of the platform of the lift and transport apparatus coupled to the frame of a wheelchair.
Figure 23:
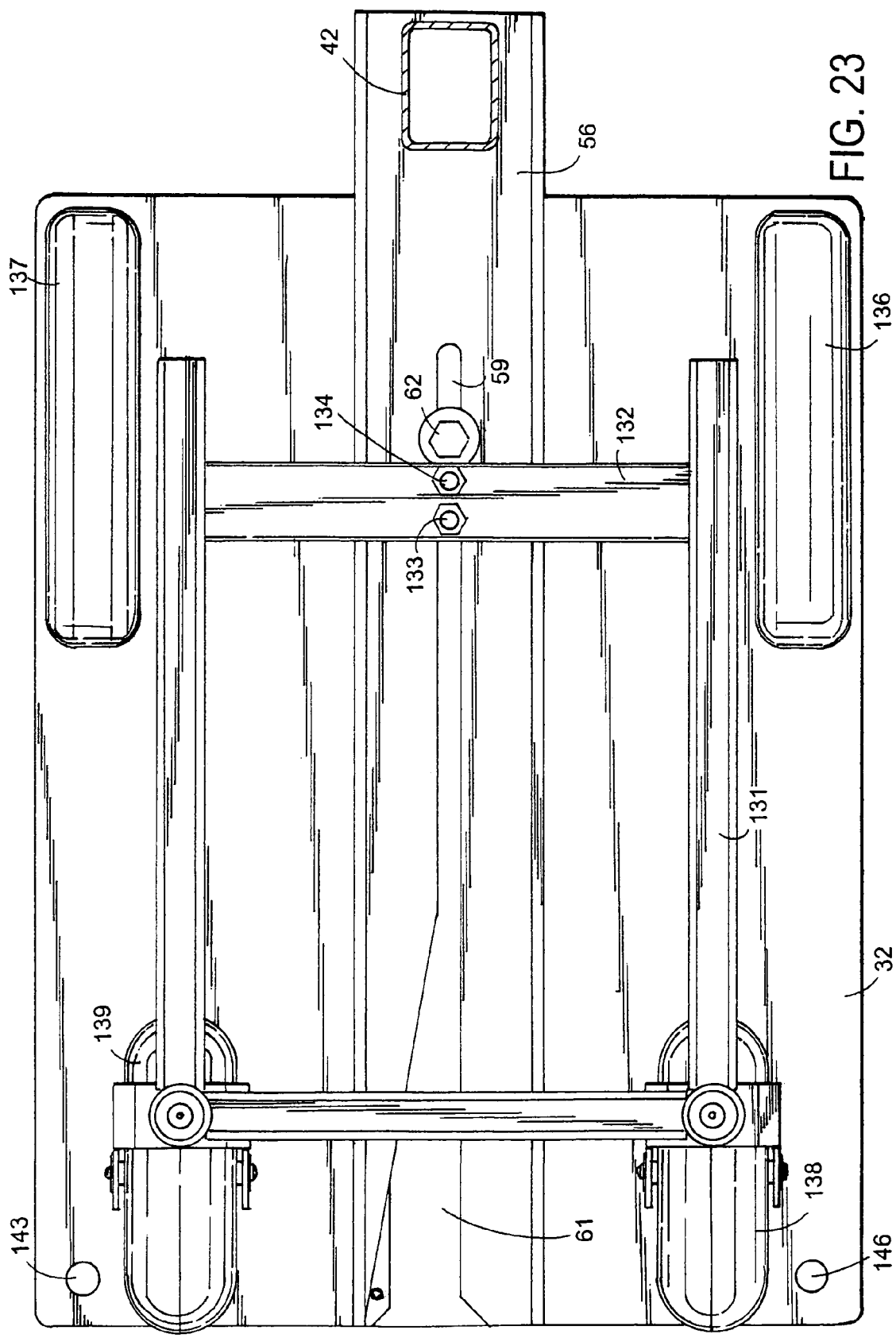
FIG. 23 is a top plan view of FIG. 22.
Figure 24:
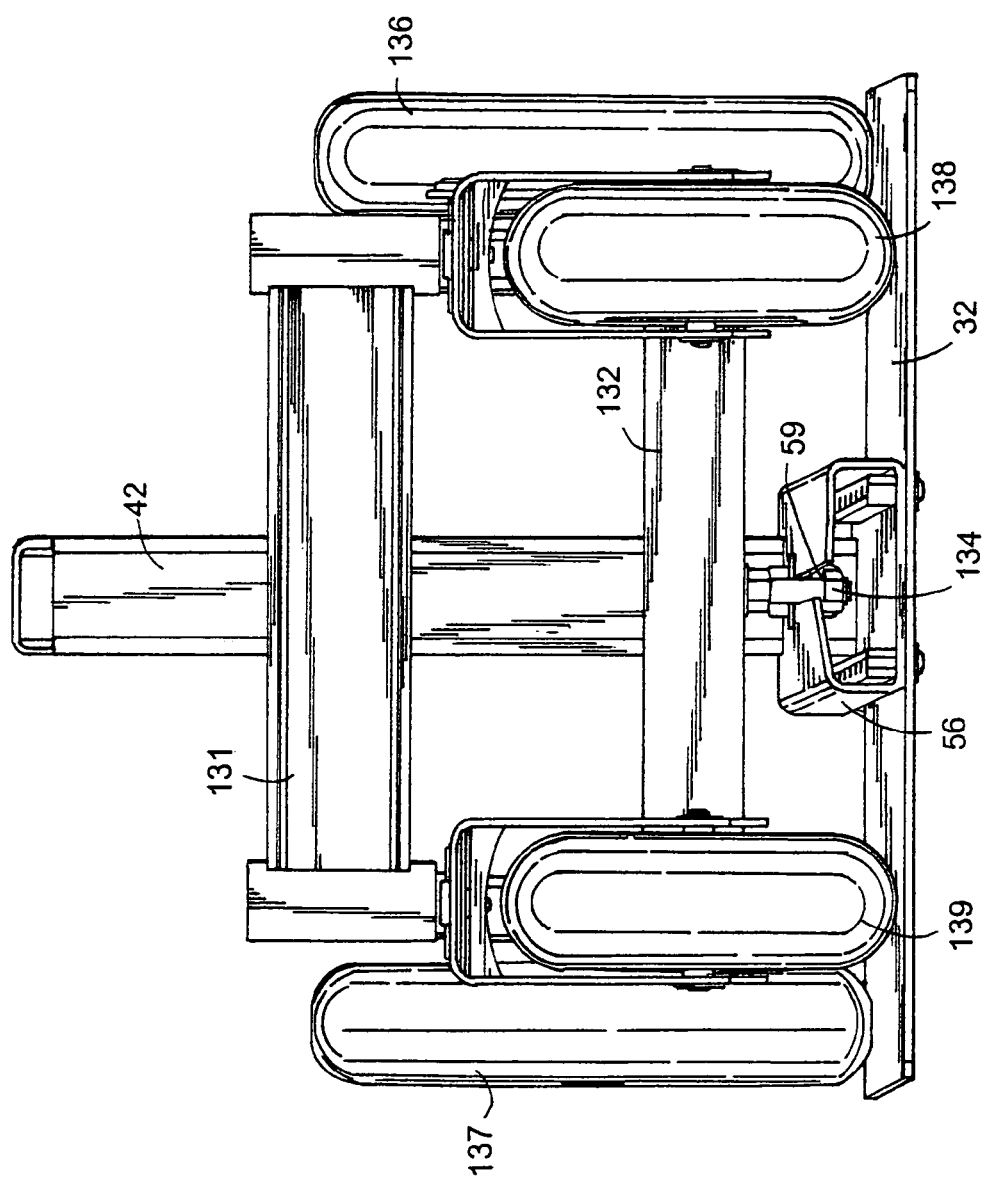
FIG. 24 is a front elevational view of FIG. 22.
Figure 25:
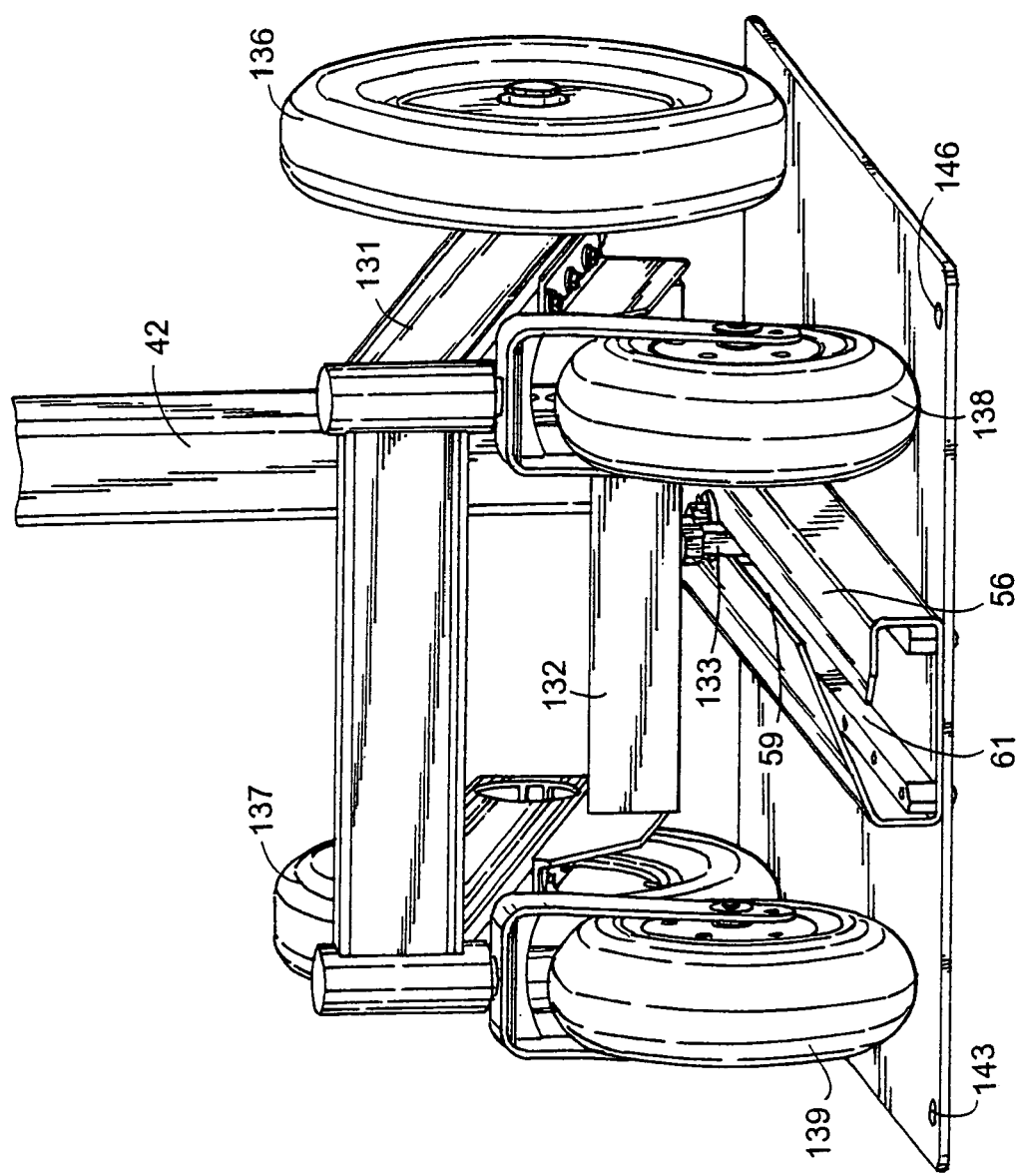
FIG. 25 is a perspective view of the platform supporting a wheelchair.

A short boss 63 secured to the outside wall of tubular member 41 is attached to an upright flat plate 64. Plate 64 has a plurality of vertical slots or openings accommodating bolts 66, 67, 68 and 69. As shown in FIG. 20, bolts 66-69 are connected to a plate 71 secured to the inside of the side door 72 of the vehicle. The vertical slots in plate 64 allow the location of the bolts 66-69 to be adjusted to change the elevation and angular positions of the door 72 to fit in the doorway of the vehicle.

Figure 16:
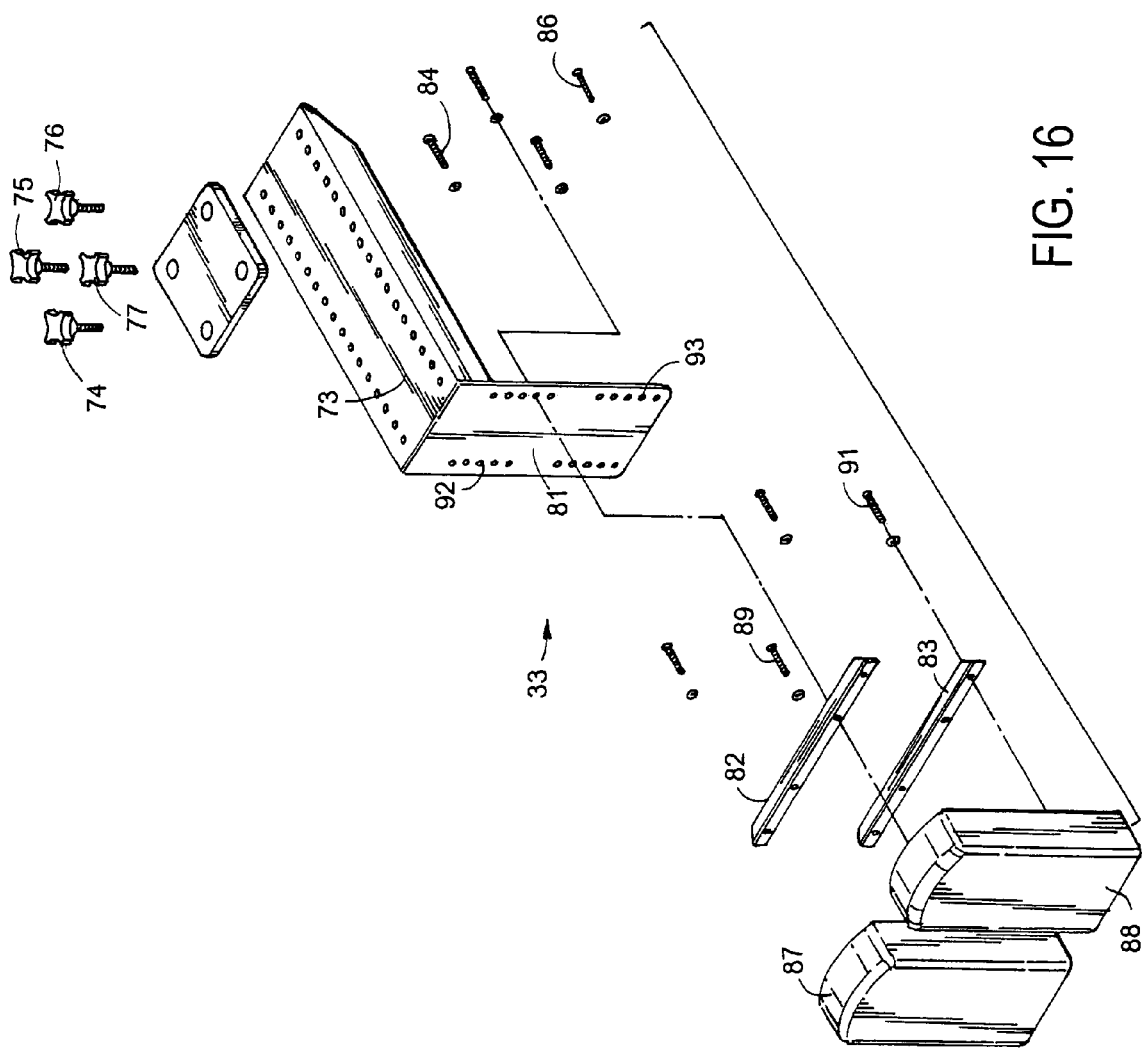
FIG. 16 is an exploded perspective view of the adjustable headrest of the wheelchair lift and transport apparatus of FIGS. 1 and 8.

Headrest 33, shown in FIGS. 1, 2, 3 and 16, has a horizontal member 73 connected to the top of tubular member 41 with a plurality of knob bolts 74, 75, 76 and 77. Member 74 has two rows of holes 78 and 79 accommodating bolts 74-77 to horizontally adjust the forward and rearward location of member 73 on tubular member 41. As shown in FIG. 16, a plate 81 is secured to and extends downwardly from the front end of member 73. A pair of cross bars 82 and 83 are attached to plate 81 with bolts 84 and 86. A pair of rectangular pads 87 and 88 are mounted on cross bars 82 and 83 with bolts 89 and 91. Pads 87 and 88 are resilient cushions. Plate 81 has rows of vertical holes 92 and 93 that allow for vertical adjustments of pads 87 and 88 to accommodate different types of wheelchairs and persons using the wheelchairs.

Figure 1:
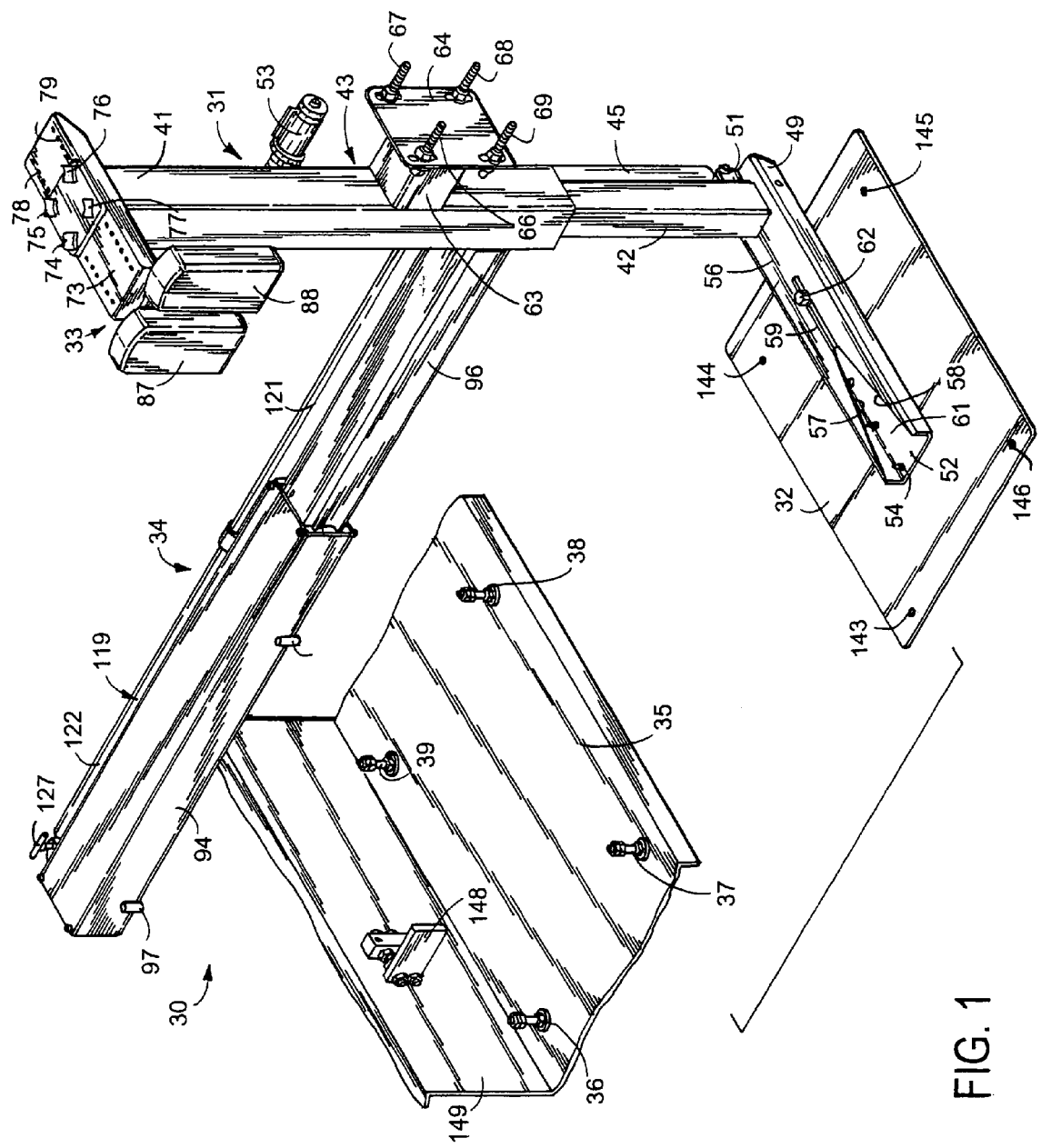
FIG. 1 is a perspective view of the lift and transport apparatus in the expanded position.
Figure 2:
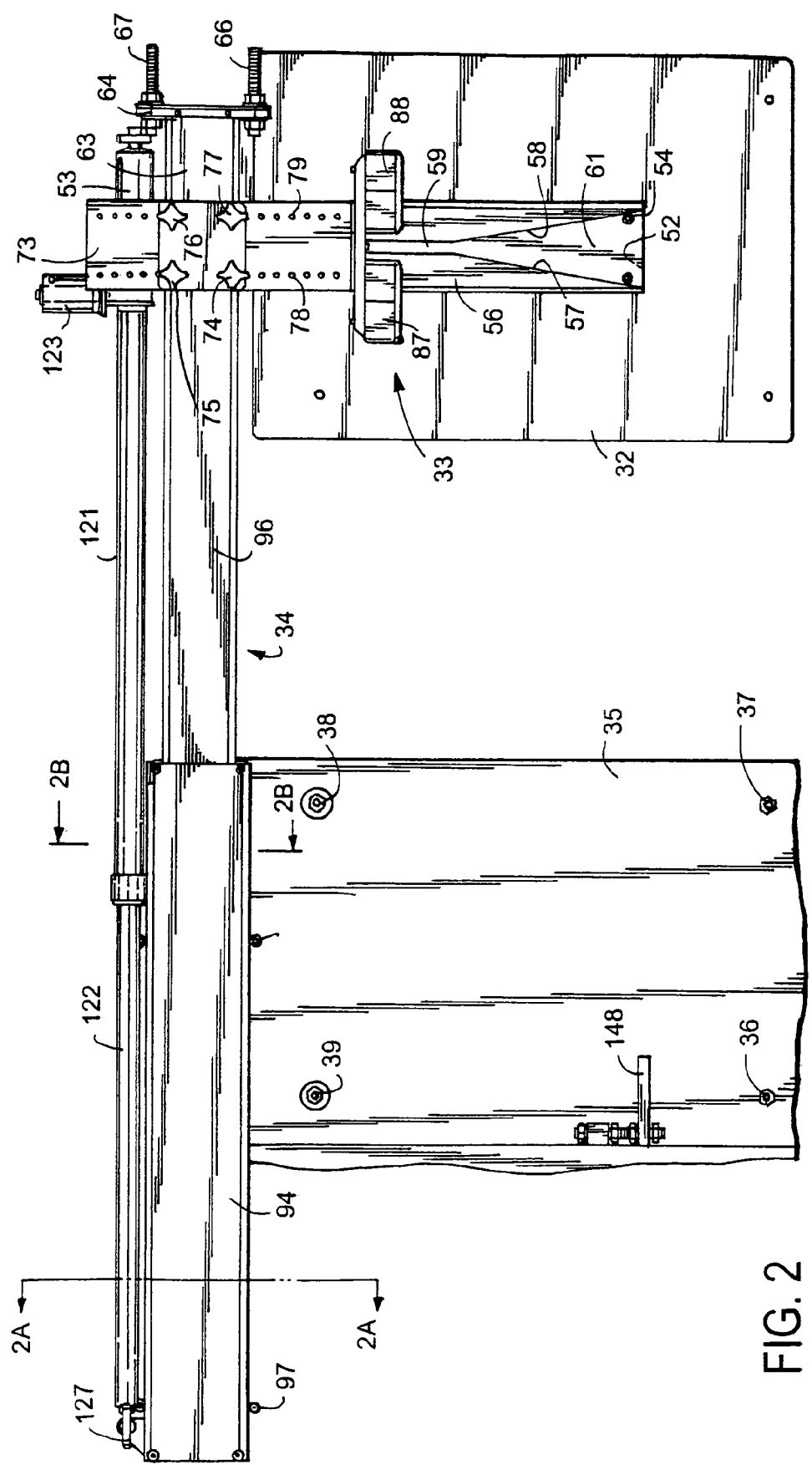
FIG. 2 is a top plan view of the apparatus of FIG. 1.
Figure 2A:
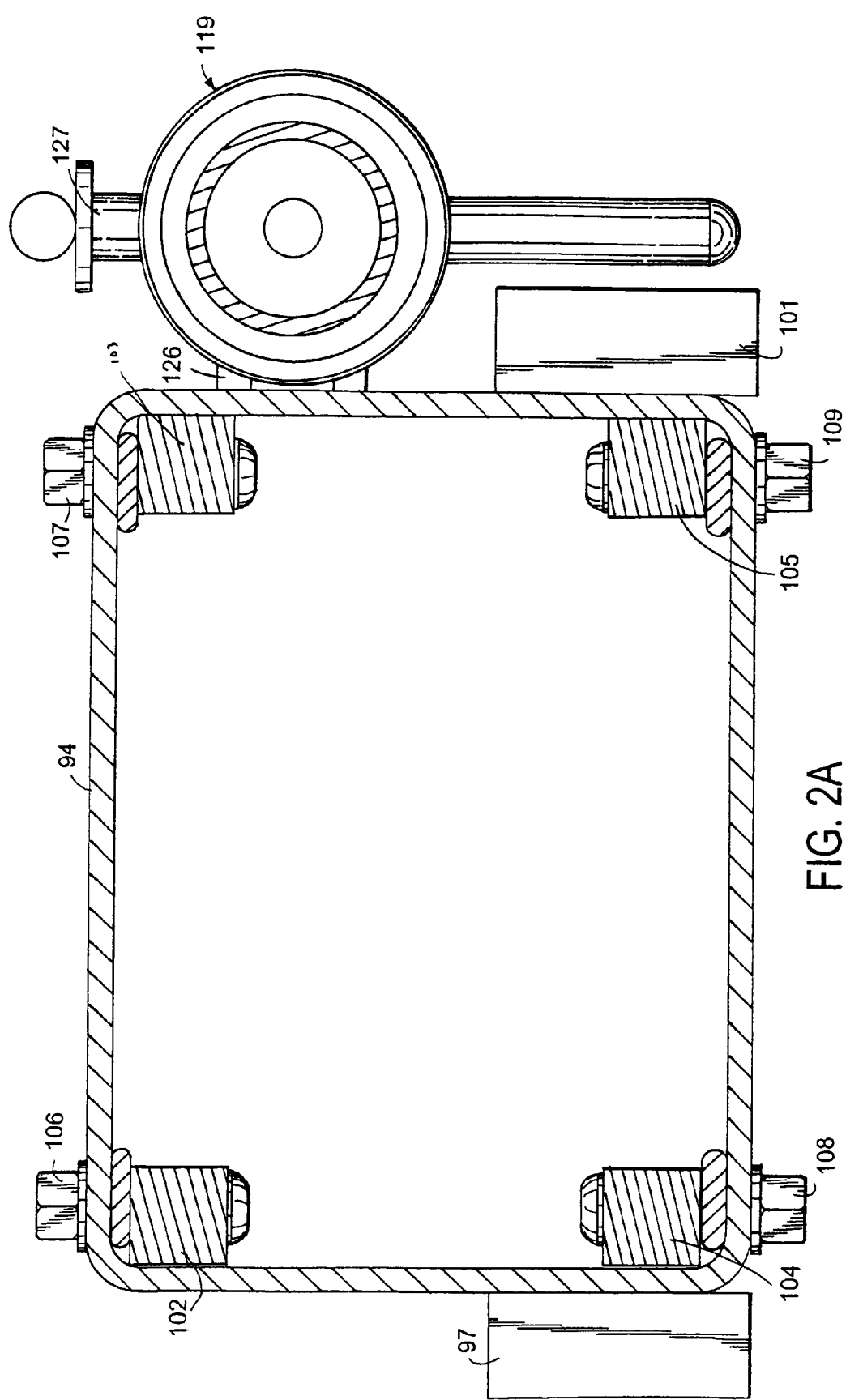
FIG. 2A is an enlarged sectional view taken along line 2A-2A of FIG. 2.
Figure 2B:
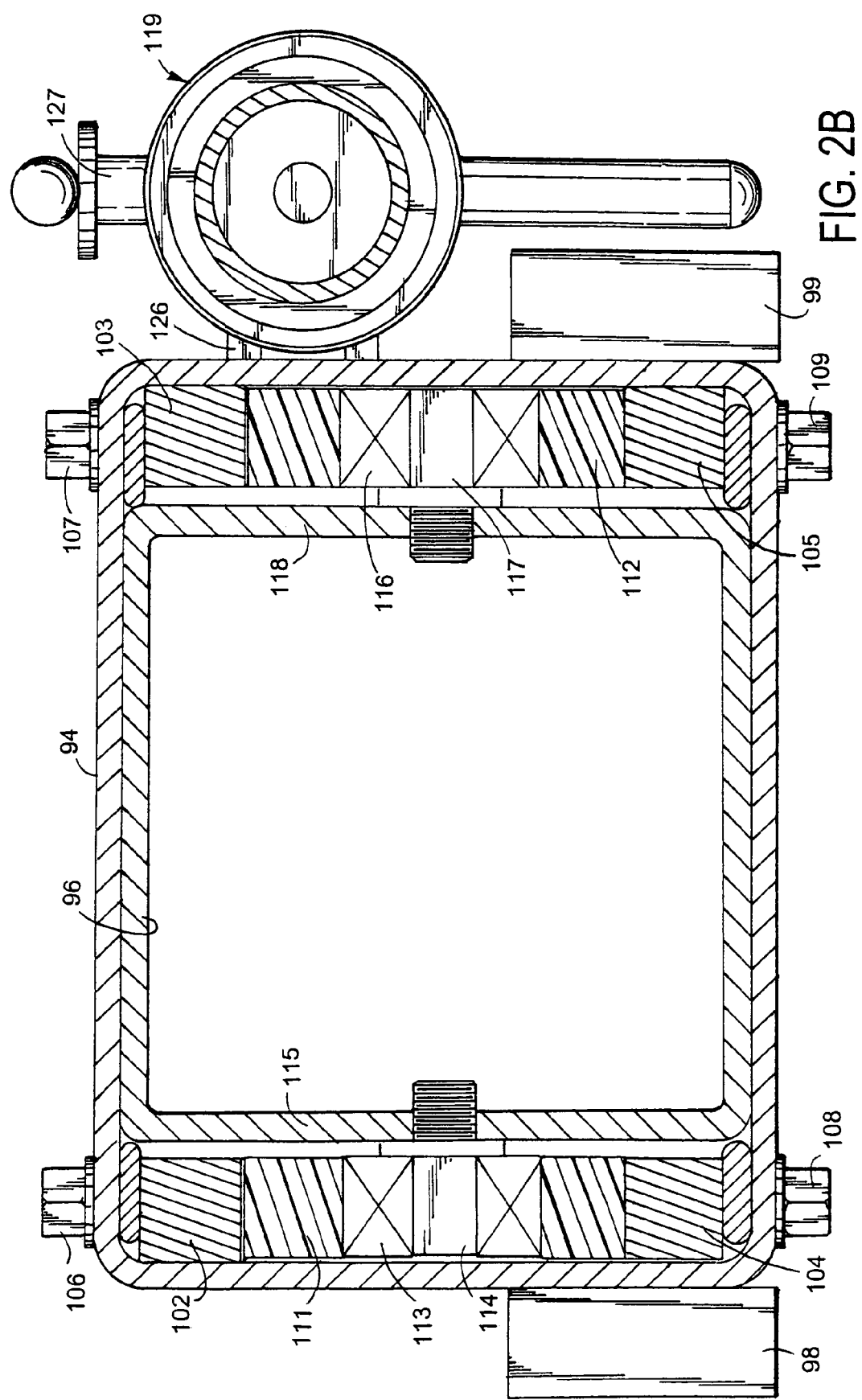
FIG. 2B is an enlarged sectional view taken along line 2B-2B of FIG. 2.
Figure 3:
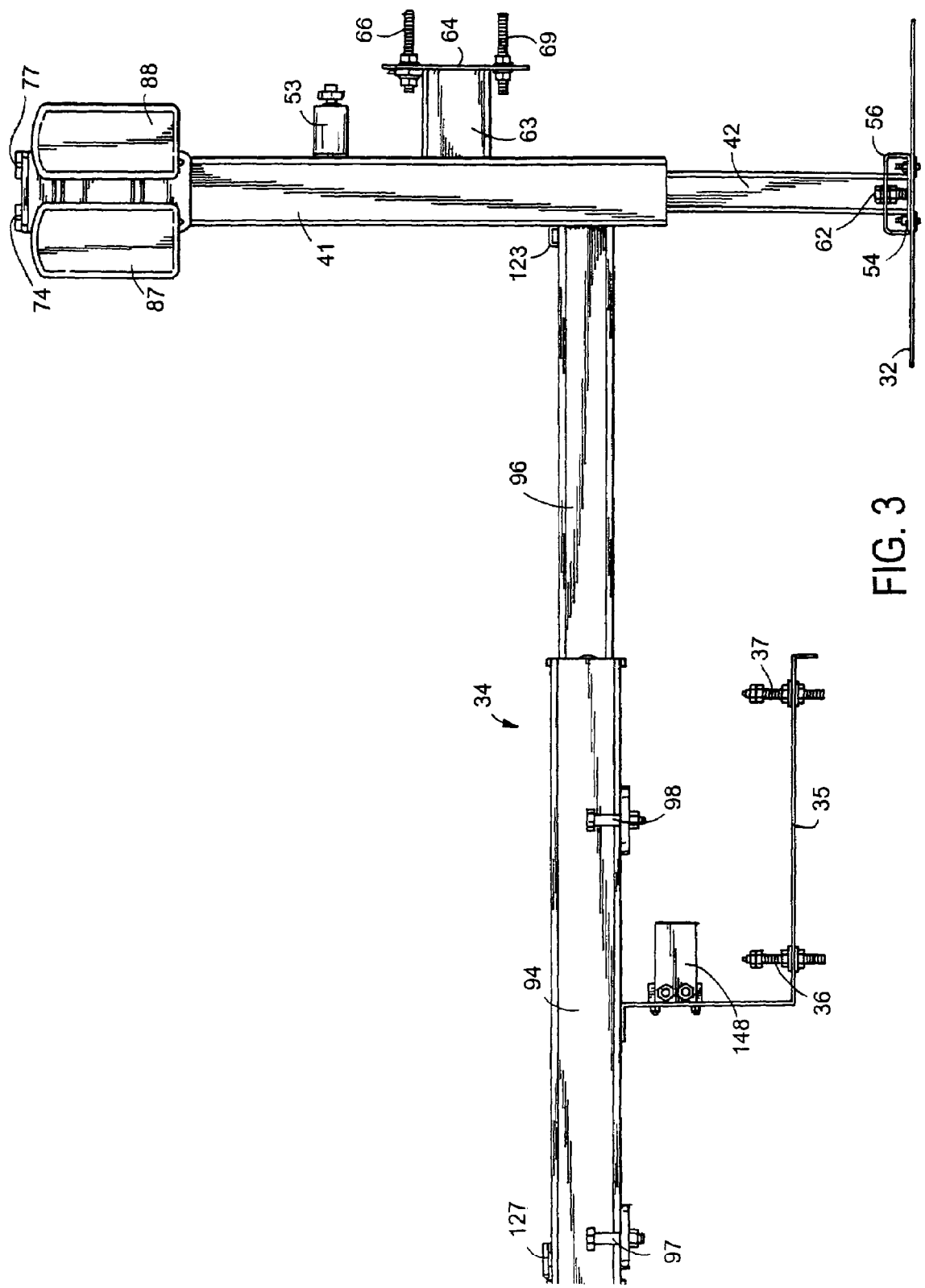
FIG. 3 is a front elevational view of the apparatus of FIG. 1.
Figure 19:
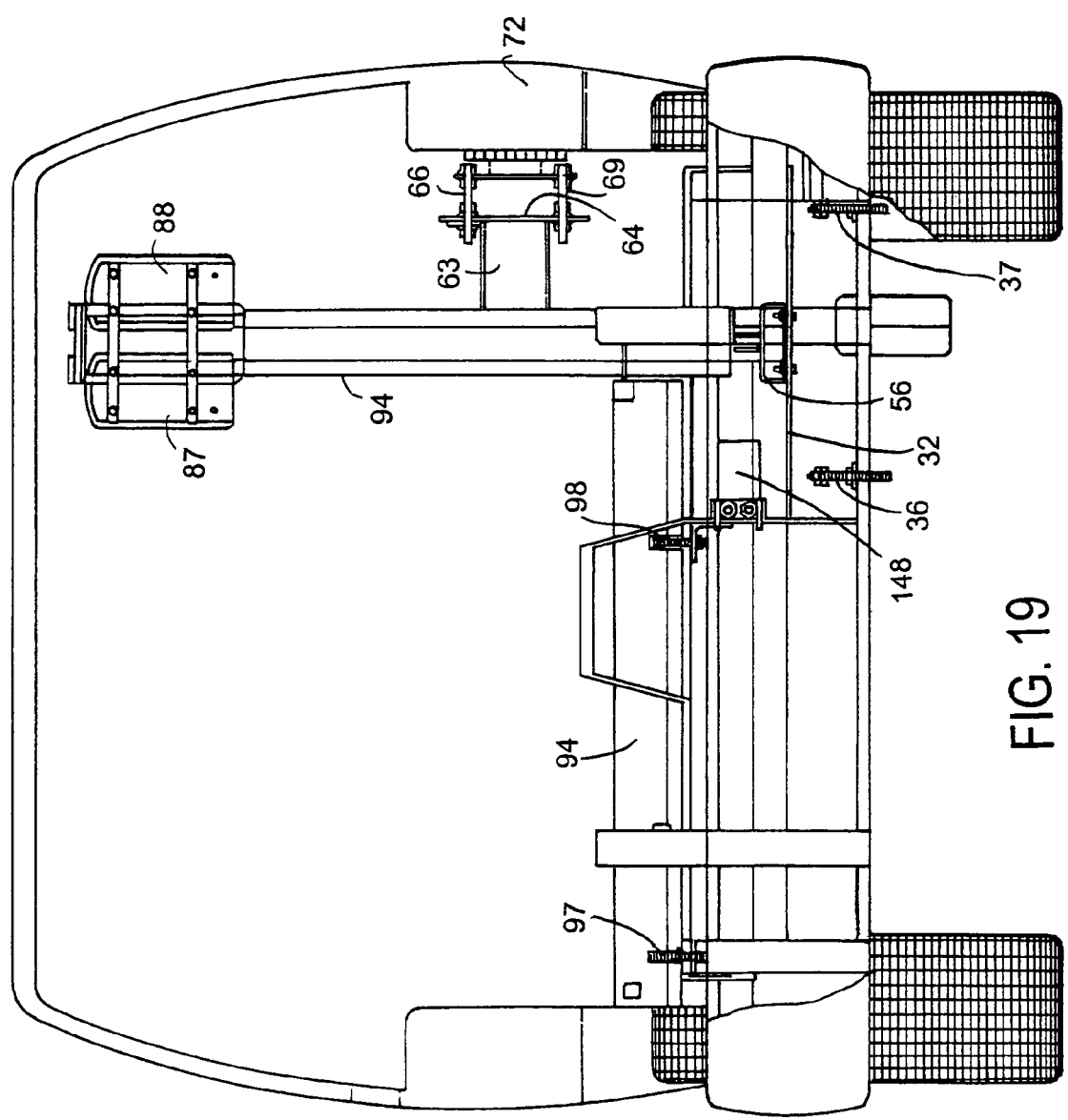
FIG. 19 is a front elevational view of FIG. 18 showing the apparatus in the retracted position.

As shown in FIGS. 1, 2, 3 and 4, lateral transport assembly 34 has a horizontal stationary box beam 94 and a movable box beam 96 that telescopes into and out of beam 94. A plurality of collars 97, 98, 99 and 101 accommodating fasteners, such as bolts, secure beam 94 to the floor or frame of the vehicle, as shown in FIGS. 18, 19, and 20. Beam 96 has an outer end secured with welds to the inside wall of upright member 41. As shown in FIG. 2A, four rails 102, 103, 104 and 105 are located adjacent the inside corners of beam 94. Rails 102-105 extend the length of beam 94. Opposite ends of each rail is attached to beam 94 with bolts 106, 107, 108 and 109. Rails 102-105 are metal rods that support beam 96 on beam 94. As shown in FIG. 2B, wheels or rollers 111 and 112 on opposite sides of beam 96 ride on rails 102-105 to movably support beam 96 on rails 102-105. Wheel 111 is rotatably supported on a bearing 113 mounted on an axle 114 secured to a side wall of beam 96. Wheel 112 is rotatably supported on a bearing 116 mounted on an axle 117 secured to side wall 118 of beam 96. A pair of longitudinally spaced wheels are mounted on each side of beam 96 to vertically stabilize beam 96 on rails 102-105 and allow beam 96 to be moved to extended and retracted positions thereby moving the elevated platform from the elevated or second position to a third position inside the vehicle behind the steering wheel of the vehicle.

A horizontal second linear actuator 119 mounted on beams 94 and 96 operate to move beam 96 between extended and contracted positions relative to beam 94. Actuator 119 functions to horizontally transport lift assembly 31 and platform 32 from one extended position laterally of the vehicle to a contracted position within the vehicle thereby locating a wheelchair carried on the platform in the vehicle driver position behind the vehicle steering wheel. Actuator 119 has an elongated cylinder 121 accommodating a piston 122. Actuators having elongated screws, chains and hydraulic cylinder and air cylinders can be used for actuator 119. As shown in FIGS. 2 and 4, a reversible drive motor 123 mounted on the outer end of cylinder 121 is drivably connected to the linear moving structure of actuator 119 to selectively extend and contract the actuator. Motor 123 can be a DC reversible electric motor or a fluid operated motor coupled to electric controls, such as switches or in the case of a fluid operated motor coupled to valves and valve controls for operating the motors. As shown in FIG. 4, the outer end of cylinder 121 is connected with a pin 124 to a pair of brackets 126 attached to cylinder 44 and member 41. The outer end of piston 122 is connected with a pin 127 to a pair of brackets 128 secured to the inner end of beam 94. Pin 127 can be removed from brackets 128 and outer end of piston 122 to release actuator 119 and allow free movement of beam 96 relative to beam 94.

In use, as shown in FIGS. 21 to 24, the lift assembly 31 is moved to its out or loading position with platform 32 on the ground adjacent the side of vehicle 129. Vehicle side door 73 being connected to lift assembly 31 is supported laterally of vehicle 129 to allow a wheelchair to back onto platform 32. As shown in FIGS. 22 to 25, wheelchair frame 131 has a cross bar 132 supporting a pair of downwardly extended anchor bolts 133 and 134. The wheelchair is moved rearwardly positioning anchor bolts 133 and 134 in slot 59. Stop bolt 62 limits rearward movement of the wheelchair with the drive wheels 136 and 137 and caster wheels 138 and 139 positioned on platform 32. An example of a wheelchair having frame 131 is disclosed by P. E. Schlangen in U.S. Pat. No. 6,375,209. Actuator 43 is activated to lift platform 32 with the wheelchair and person on the wheelchair from the ground or first position to a second elevated position adjacent the side of vehicle 129. Motor controls 141 and 142, such as electric switches, mounted on the inside of door 73 are used by the person on the wheelchair to activate the actuator motors 53 and 123. Motor controls can alternatively be mounted on a support secured to platform 32. When motor 53 is operating to either raise or lower platform 32 and wheelchair thereon, motor 123 is inactive. When motor 123 is operating to laterally transport platform 32 and wheelchair thereon from the second position to a third position within vehicle 129, motor 123 is inactive. Motor 123 is only operated when platform is in the raised or second position. Motor control for motors 53 and 123 includes a remote signal device useable by the person on the wheelchair to activate motor 123 to open and close door 73 and to raise and lower platform 32. This allows the person in the wheelchair to operate the lift and transport apparatus 30 from a location remote from vehicle 129. When platform 32 and wheelchair thereon is in the third position within the vehicle, motor 53 is activated to lower platform 32 to a fourth position in locking engagement with fixed upright pins 36, 37, 38 and 39 secured to floor 35. Platform 32 has four holes 143, 144, 145, and 146 for accommodating the upper ends of pins 36-39. Pins 36-39 support platform 32, wheelchair and person in the wheelchair on the vehicle floor 35. This relieves the weight of platform 32 wheelchair, and person in the wheelchair from lift and transport apparatus 30. The vertical height of pins 36-39 and nuts thereon are adjustable to change the elevation of platform 32 relative to floor 35 and level platform 32 to accommodate different persons and wheelchairs. Lift assembly 31 prevents platform 32 from lifting off pins 36-39 thereby fixing the location of the wheelchair in the vehicle driver's position behind the steering wheel. A lateral stop arm 148 secured to a side wall 149 of floor 35 operates as a stop for the inside drive wheel of the wheelchair preventing the wheelchair from moving forward. Stop arm 148 in combination with platform 32 on anchor pins 36-39 and lift assembly 31 holds the wheelchair in a fixed position within the vehicle. The wheelchair is prevented from moving forward, backward, and in lateral and vertical directions.

A modification of the lift and transport apparatus is shown in FIGS. 8 to 14 and 17. Lift and transport apparatus 200 is used to vertically lift an object, such as a wheelchair supporting a person from a ground first location to an elevated second location and laterally move the wheelchair from the second location to a third location directly behind a motor vehicle steering wheel and vertically move the wheelchair from the third location to a vehicle driving fourth location. The wheelchair is located down in the fourth position to allow the person in the wheelchair to operate the vehicle. Lift and transport apparatus can be adapted to lift and transport a wheelchair into the passenger side, back seat and rear areas of motor vehicles and non-motor vehicles. Apparatus 200 has general utility for lifting an object, product or container from a first ground location to a second elevated location and then laterally transport the object from the second location to a third location and reverse the motions to return the object to the first ground location.

Figure 17:
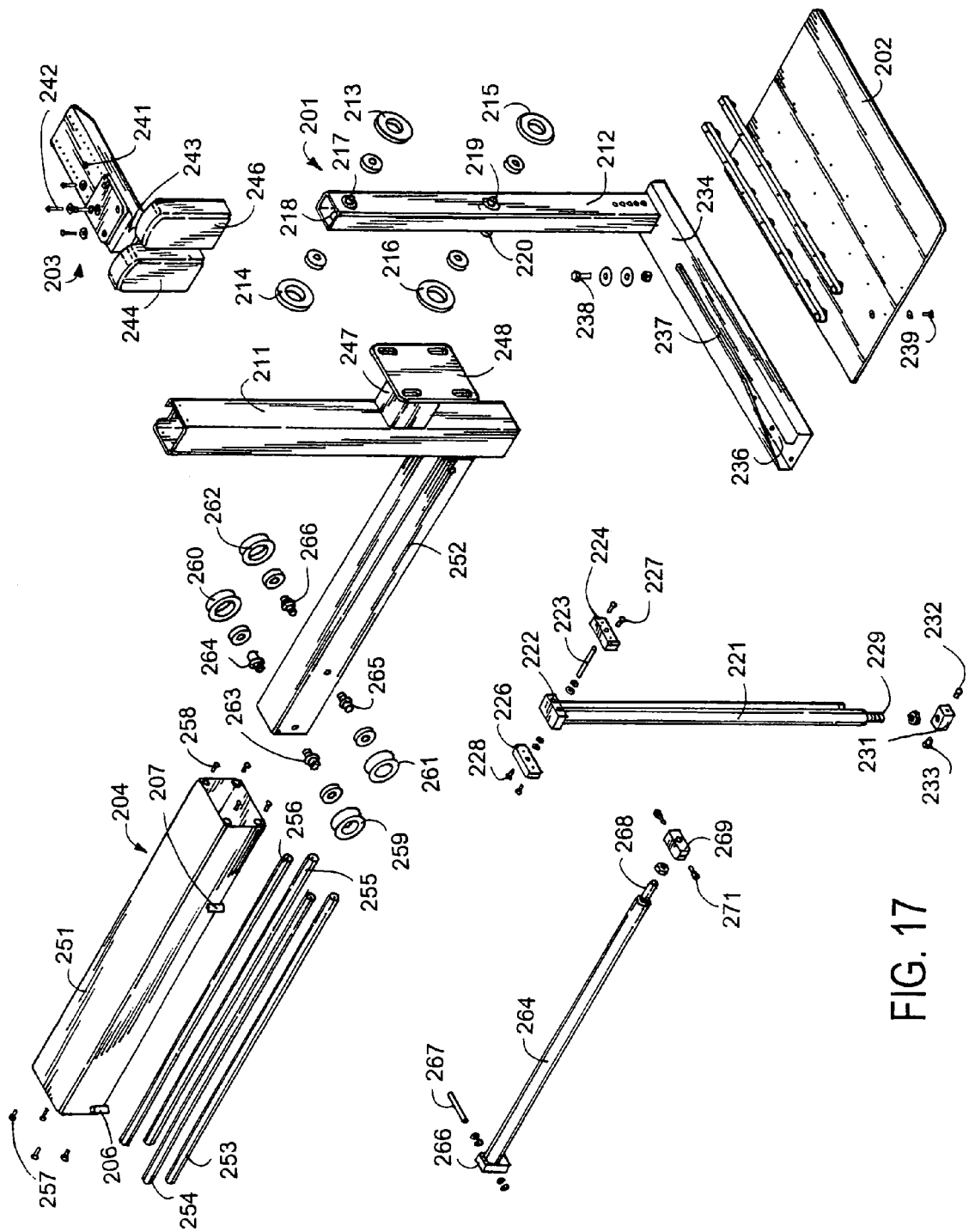
FIG. 17 is an exploded perspective view of the apparatus of FIG. 8.

Lift and transport assembly 200 has an upright lift assembly 201 secured with a wheelchair coupling member 234 to a horizontal platform 202 and a headrest 203. A lateral transport assembly 204 secured to lift assembly 201 operates to laterally move lift assembly 201 and platform 202 to a selected location. Transport assembly 204 is secured to a floor or frame of a motor vehicle with fasteners connected to collars 206, 207, 208, and 209 attached to assembly 204. Lift assembly 201 has a first upright tubular member 211 on a second tubular member 212 telescoped into tubular member 211. As shown in FIG. 17, rollers or wheels 213, 214, 215 and 216 rotatably mounted on axes 217, 218, 219 and 220 mounted on member 212 movably support member in telescopic relation with member 211. A piston and cylinder assembly 221 located within tubular members 211 and 212 operates to selectively raise and lower member 212 and platform 202. Piston and cylinder assembly 221 is a double acting fluid cylinder. The upper end of piston and cylinder assembly has a head 222 pivotally supported on a transverse pin 223. Opposite ends of pin 223 extend into holes in blocks 224 and 226 mounted on the upper end of member 211 with bolts 227 and 228. Piston 229 is threaded into a block 231 secured to the lower end of member 212 with bolts 232 and 233. Fluid controls (not shown) with manual actuators are operatively connected to piston and cylinder assembly 221 to allow the person in the wheelchair to selectively raise and lower the lift assembly 201 and platform 202.

An elongated wheelchair coupling member 234 secured to the lower end of member 212 has a V-groove 236 and slot 237 for guiding and positioning a wheelchair on platform 202. Bolts 239 secure platform 202 to member 234. A stop bolt 238 extended through slot 237 and attached to member 234 acts as a rear stop for a wheelchair on platform 202.

Headrest 203 has a channel member 241 secured with bolts 242 to the top of member 211. A vertical plate 243 secured to the front end of member 241 supports a pair of laterally spaced pads 244 and 246. Pads 244 and 246 are resilient cushions. Headrest 203 had the same structure as headrest 33 shown in FIG. 16.

A short lateral boss 247 secured to lift member 211 has an outer end attached to an upright plate 248. Corner portions of plate 248 have upright slots 249 for bolts connecting plate 248 to the inside of a door of a vehicle. The connection to the door is the same as the bolt to door connection shown in FIGS. 19 and 20. Slots 249 in plate 248 permit vertical and angular adjustment of the door.

Transport assembly 204 has a main box team 251 adopted to be transversely secured to the floor of a vehicle with fasteners cooperating with collars 206, 207, 208 and 209 secured to opposite sides of beam 251. A second box beam 252 having an outer end secured to beam 211 and an inner end section telescoped into the main box beam 251. Rails or linear rods 253, 254, 255 and 256 located adjacent the inside corners of box beam 251 are attached to beam 251 with bolts 257 and 258. Wheels or rollers 259, 260, 261 and 262 are rotatably mounted on axles 263, 264, 265, and 266 attached to opposite sides of beam 252. Wheels 259-262 ride on rails 253-256.

A linear actuator, shown as a piston and cylinder assembly 264, operates to laterally move beam 252 relative to beam 251 to move the wheelchair in and out of the vehicle. Piston and cylinder assembly 264 is a double acting fluid cylinder operable with fluid pressure to reciprocate beam 252. Fluid controls (not shown) having manual actuators are used by the person in the wheelchair to control the operation of the piston and cylinder assembly 264. A head 266 attached to an end of piston and cylinder assembly 264 accommodates a pin 267 connected to the inner end of beam 251. Piston 268 is threaded into a block 269. Bolts 271 secure block 269 to the outer end of beam 252.

Figure 8:
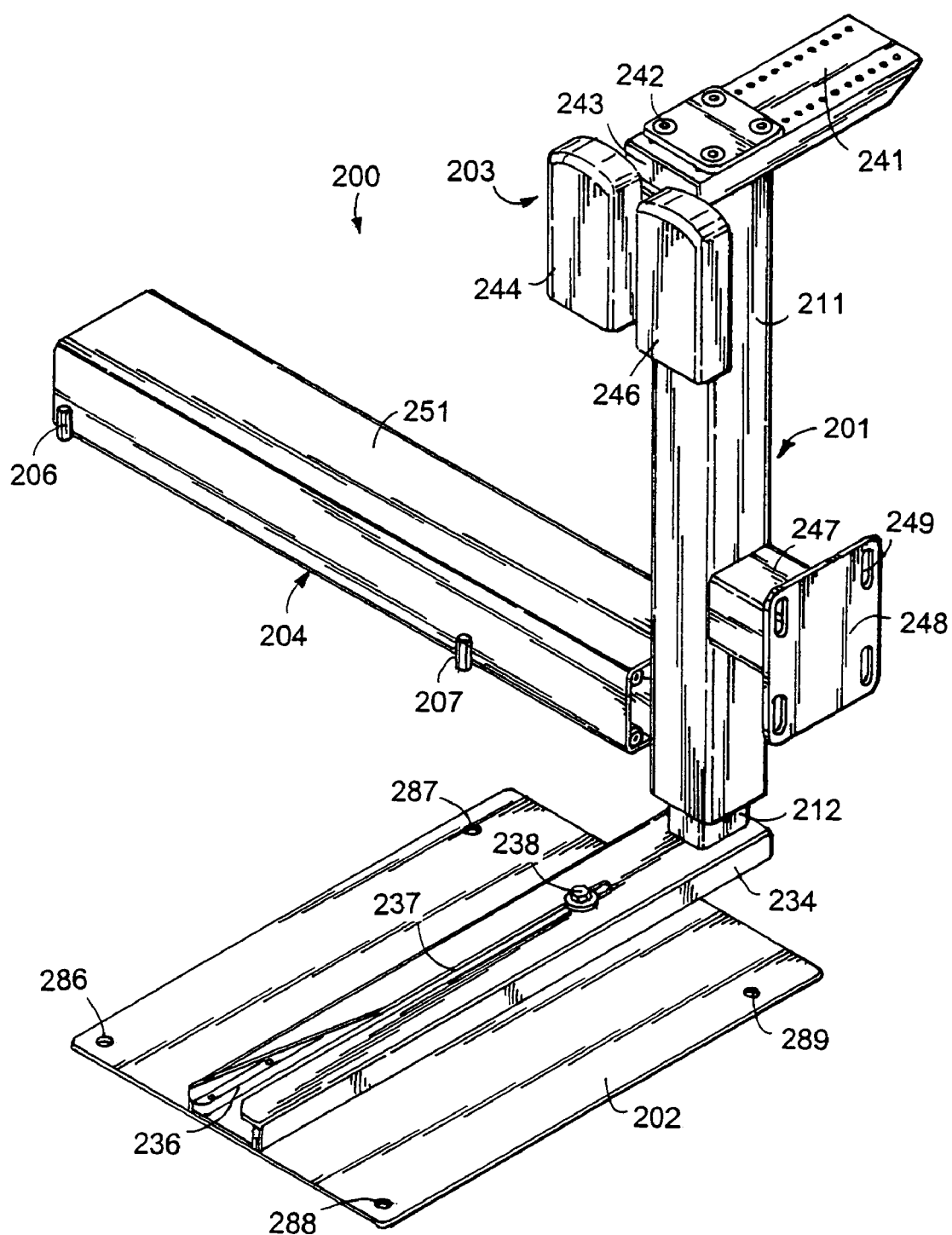
FIG. 8 is a perspective view of a modification of the lift and transport apparatus in the contract position.
Figure 9:
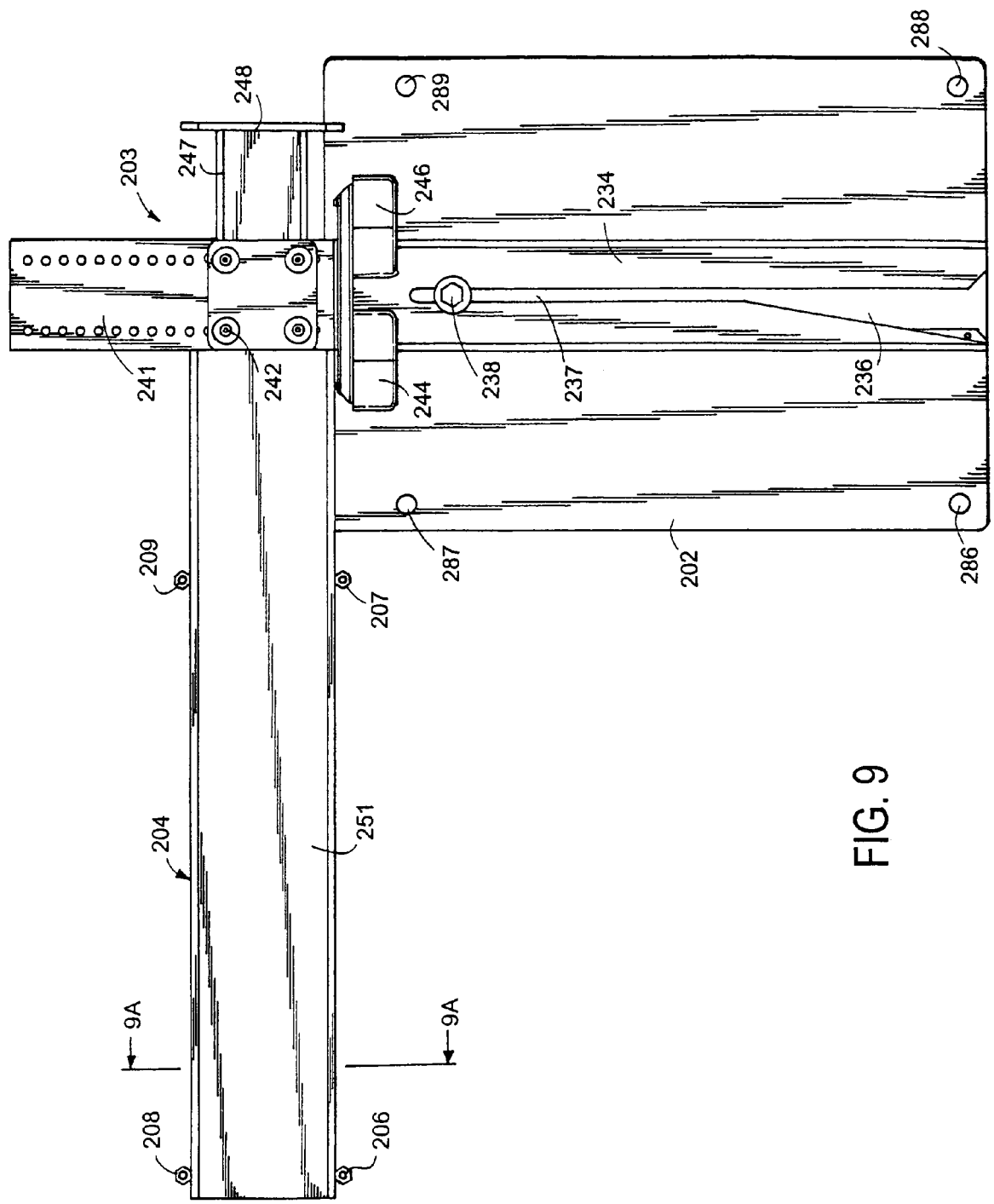
FIG. 9 is a top plan view of the apparatus of FIG. 8.
Figure 9A:
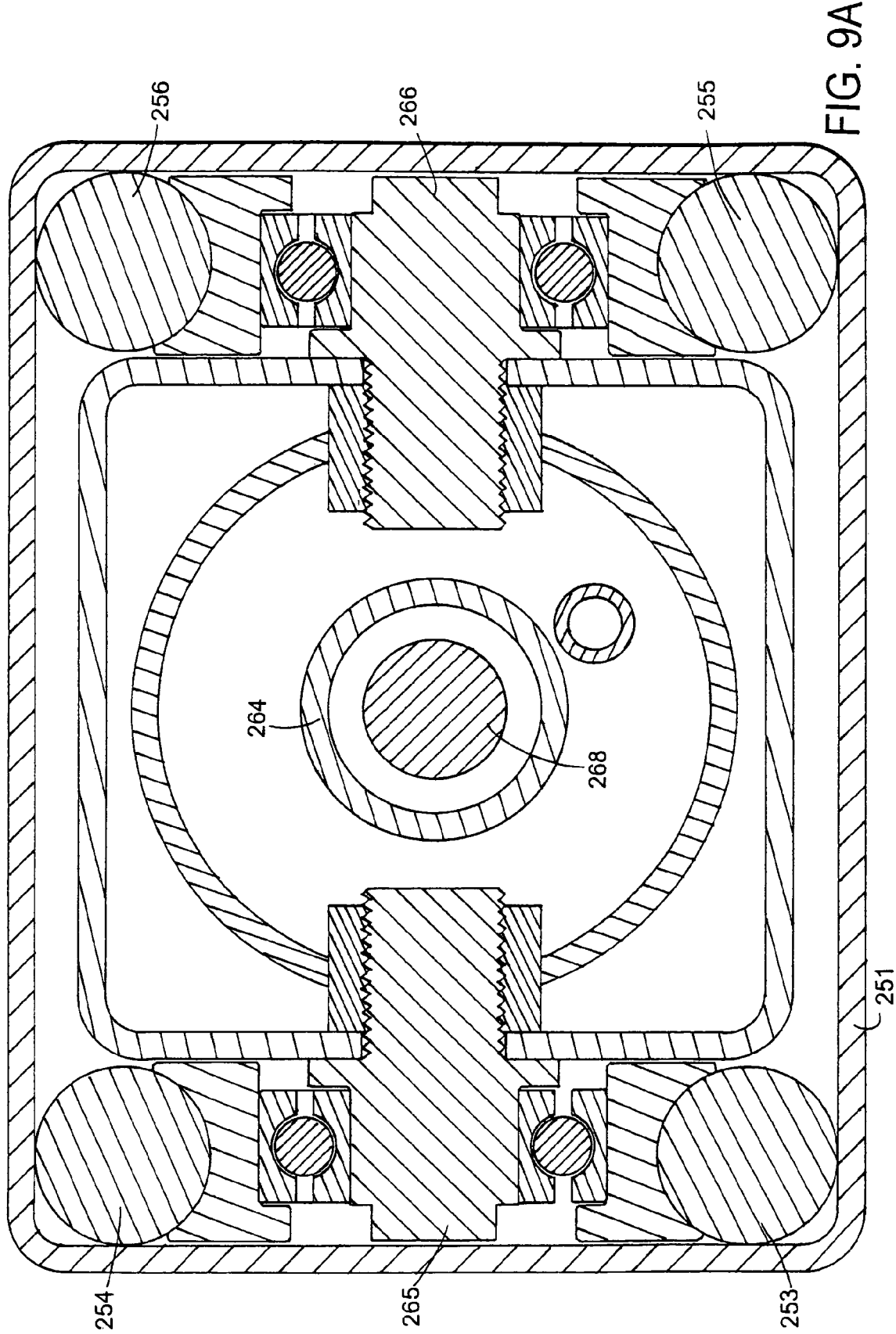
FIG. 9A is an enlarged sectional view taken along the line 9A-9A of FIG. 9.
Figure 10:
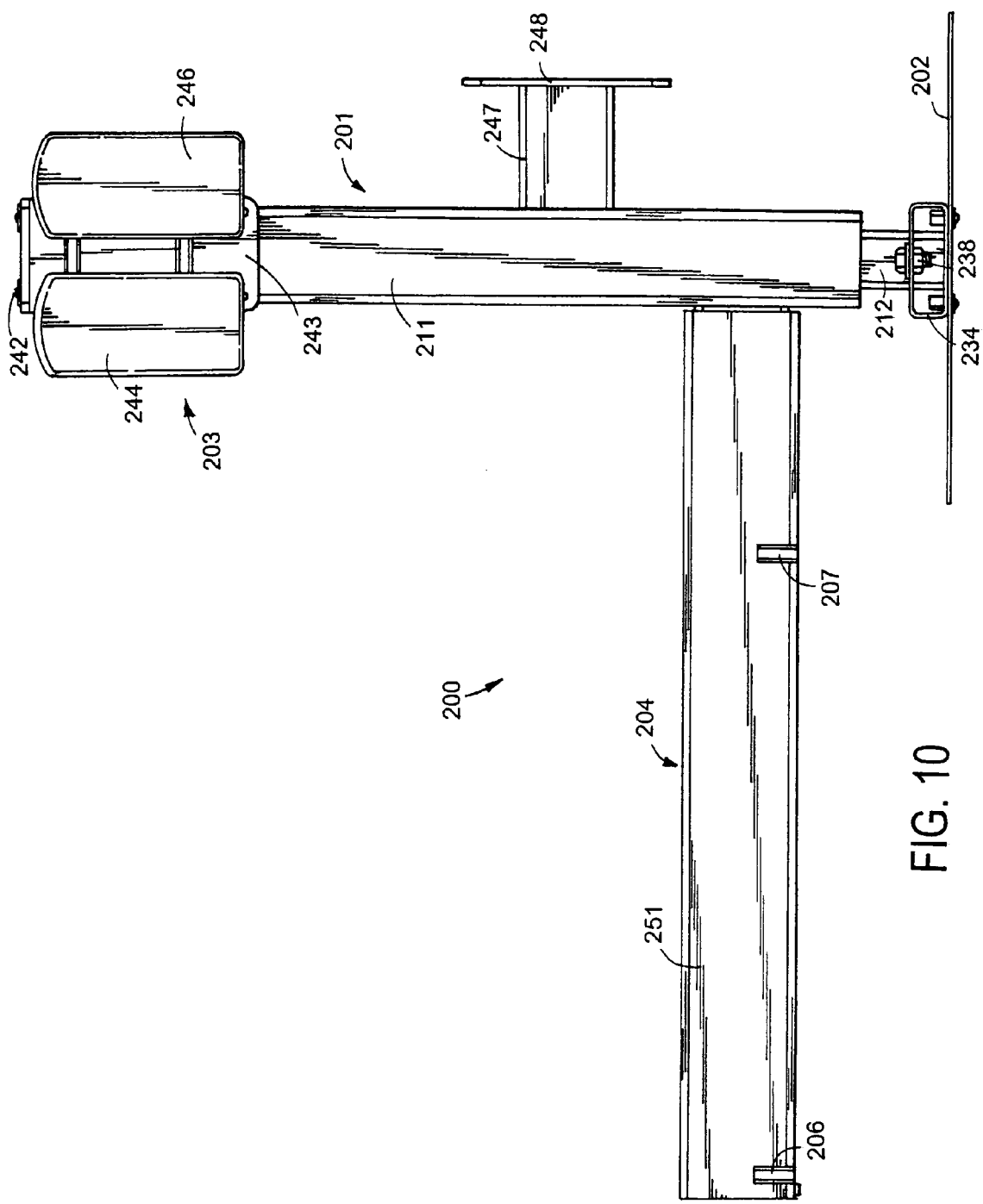
FIG. 10 is front elevational view of the apparatus of FIG. 8.
Figure 11:
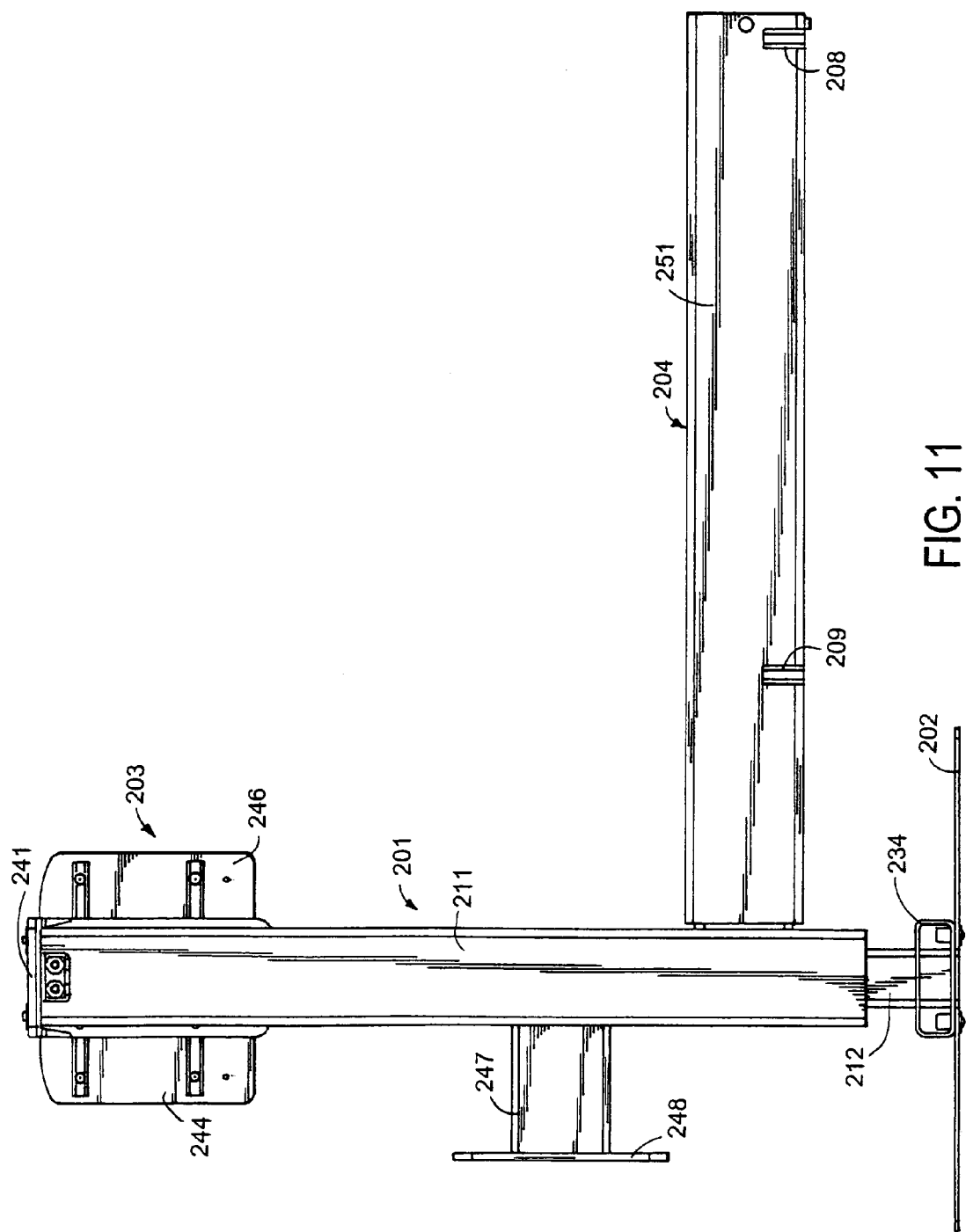
FIG. 11 is a rear elevational view of the apparatus of FIG. 8.
Figure 12:
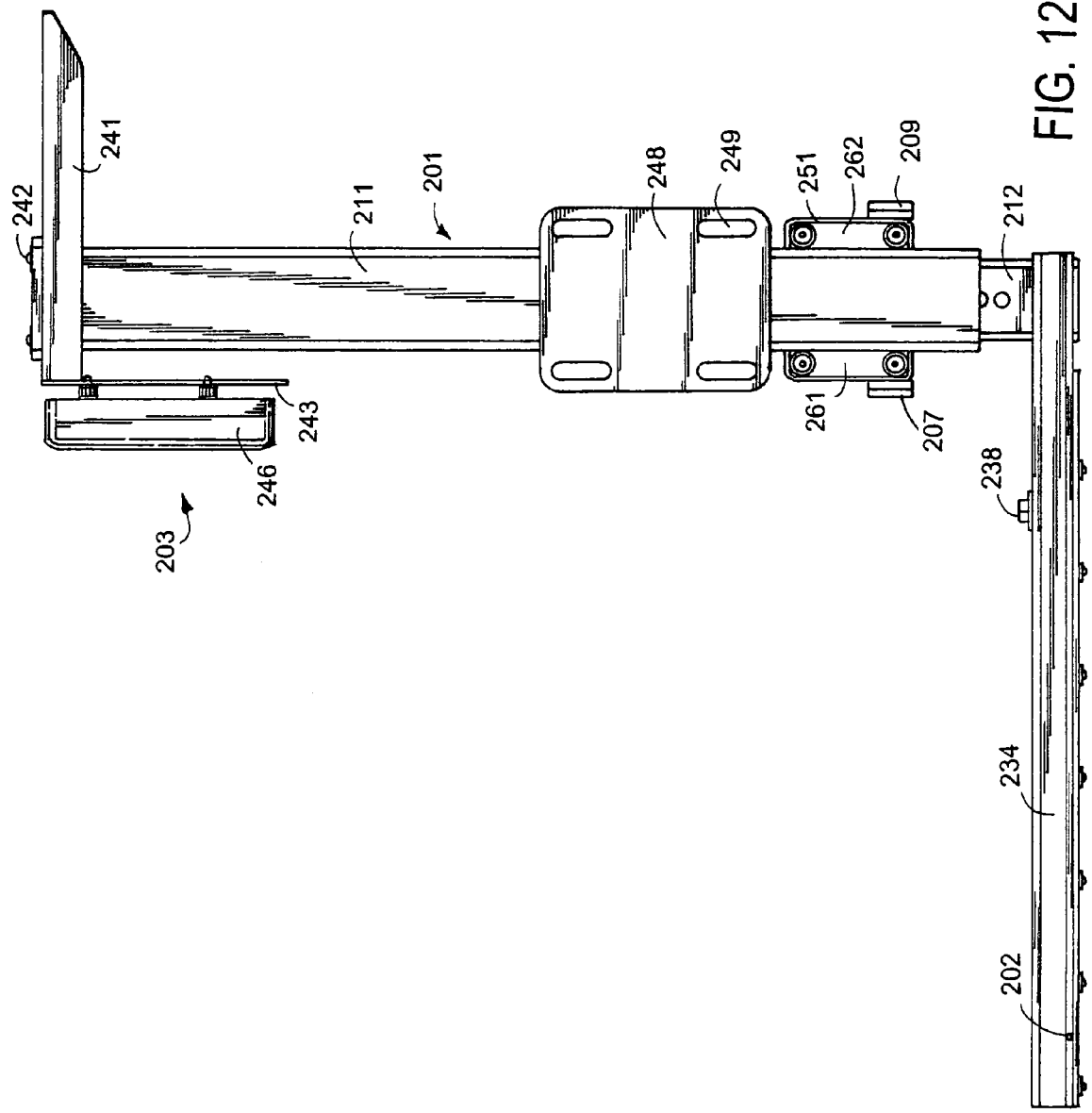
FIG. 12 is a side elevational view of the right side of the apparatus of FIG. 8.
Figure 13:
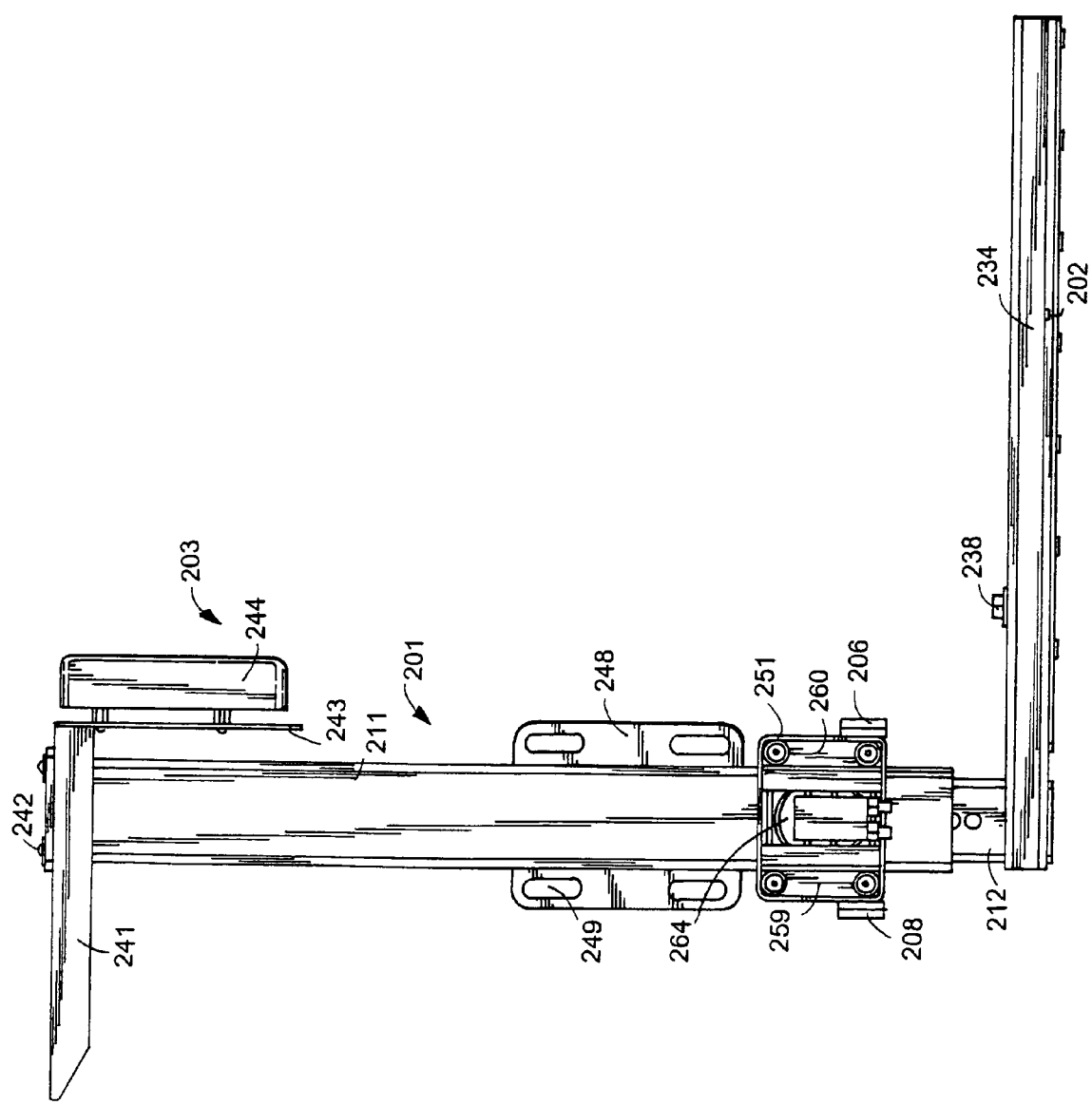
FIG. 13 is a side elevational view of the left side of the apparatus of FIG. 8.
Figure 14:
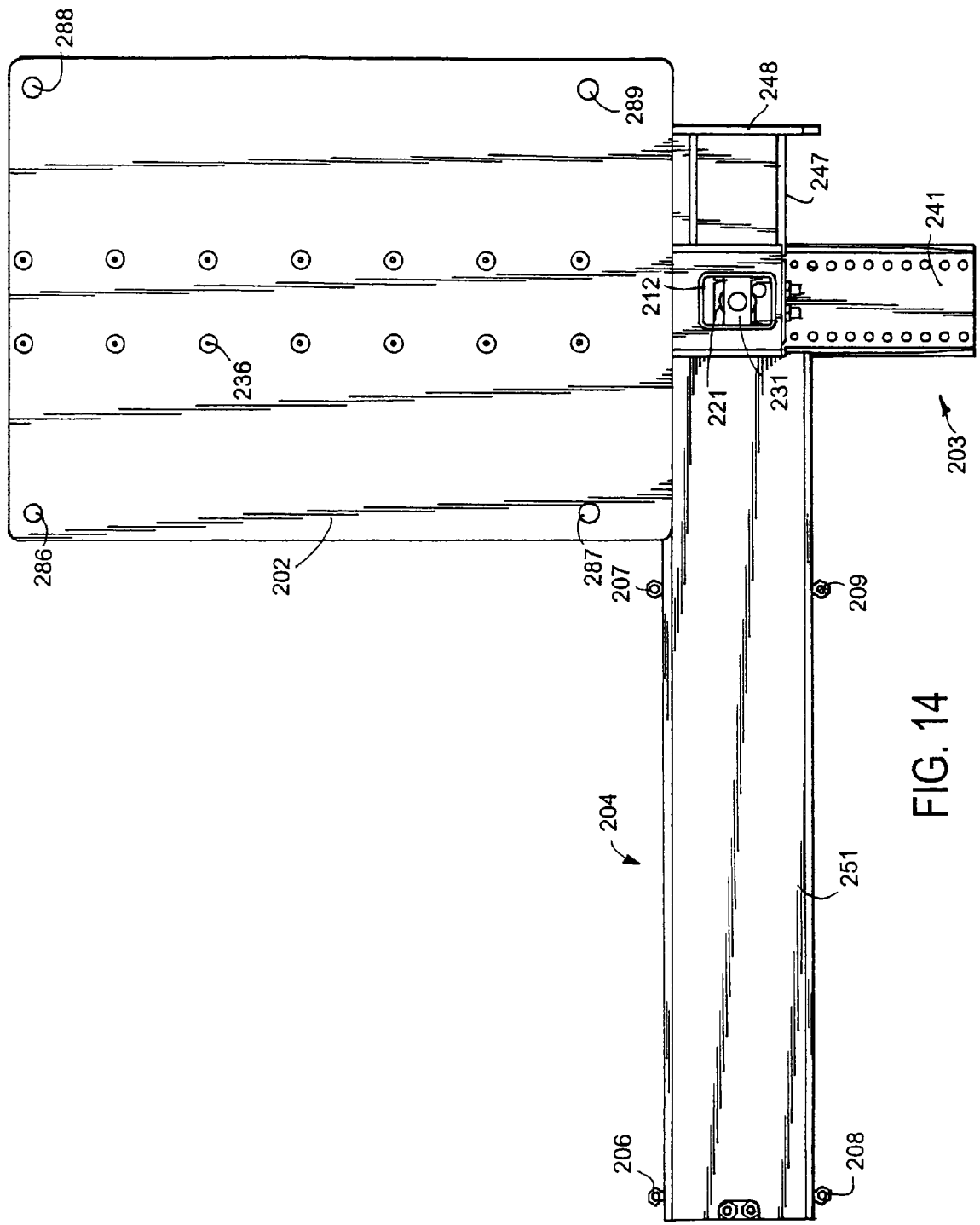
FIG. 14 is a bottom plan view of the apparatus of FIG. 8.
Figure 15:
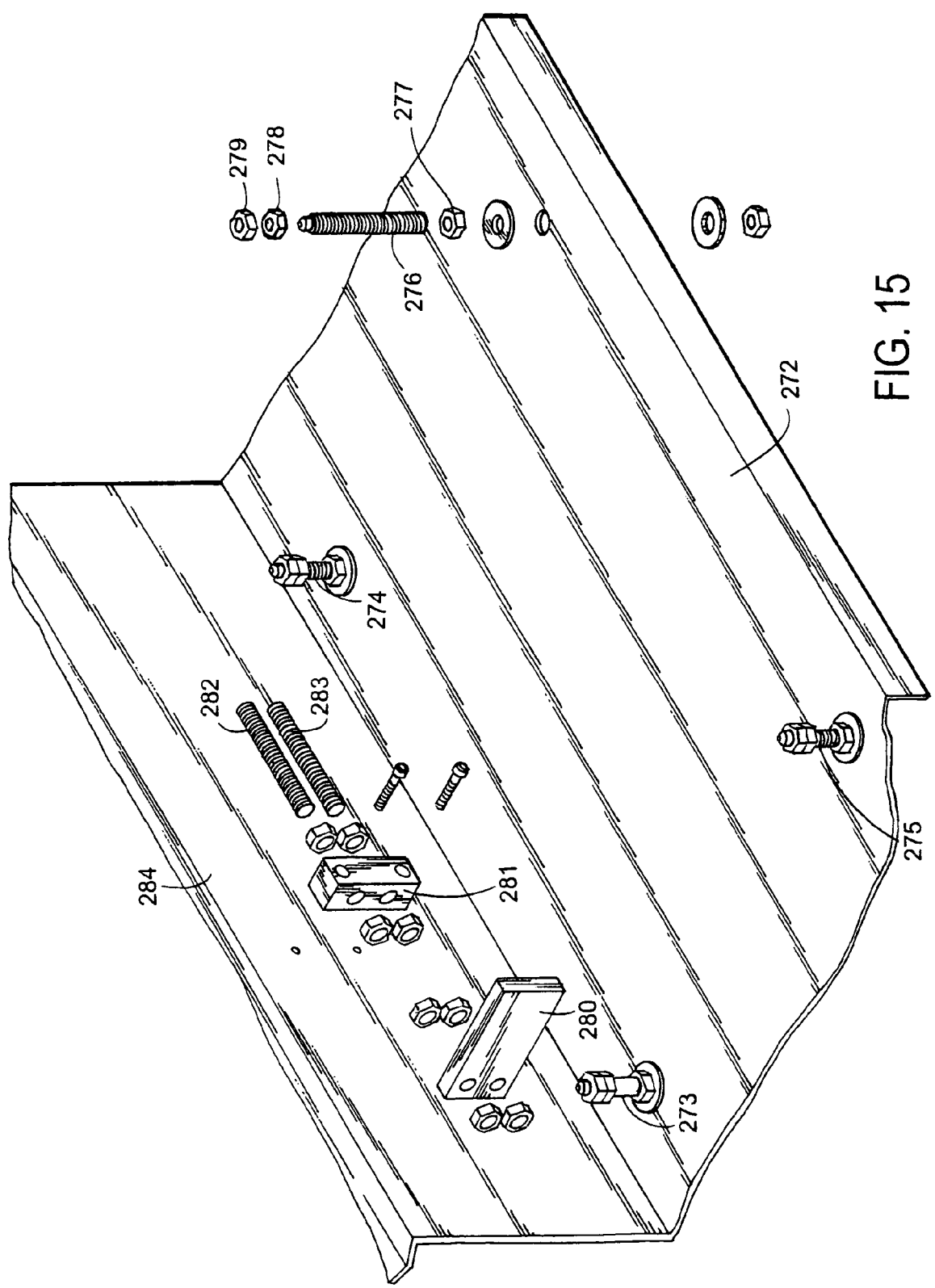
FIG. 15 is a perspective view with exploded parts of the support and anchor pins for the platform of the wheelchair lift and transport apparatus.

A section of the floor 272 of the vehicle driver's position has four upright anchor pins 273, 274, 275 and 276 for holding platform 202 in a fixed position. Pin 267 is a threaded bolt secured with nuts 277 to floor 272. A pair of nuts 278 and 279 thread on the upper end of pin 267 adjust the elevation of platform 202 on pin 267. Pins 273-275 have the same structure as pin 267. The elevation and leveling of platform 202 adjusts the location of the wheelchair within the driver location of the vehicle to accommodate different persons and wheelchairs. As shown in FIG. 8, platform 202 has four holes 286, 287, 288 and 289 in corner portions thereof. The spaces between adjacent holes correspond to the spaces between adjacent pins 273-276 so that the upper ends of the pins 273-276 project through the holes 286-289 and the platform 202 rests on the nut 279 on pin 276 and corresponding nuts on pins 273-275. The weight of platform 202, the wheelchair, and person in the wheelchair is supported by pins 273-276 and floor 272. This reduces the weight and stresses on lift and transport apparatus 200 when the wheelchair is in the vehicle driver's position. A stop arm 280 is connected to a block 281 with threaded nut and bolt assemblies 282 and 283. Block 281 is secured to an upright wall 284 of floor 272. The right wheel of the wheelchair engages stop arm 280 to limit forward movement of the wheelchair on platform 202. Stop arm 280 in combination with platform 202 on anchor pins 273-276 and lift assembly 201 holds the wheelchair in a fixed position within the vehicle. The wheelchair is prevented from moving forward, backward and in lateral and vertical directions.

Lift and transport apparatus 200 is usable with a conventional vehicle driver's bucket seat. The bucket seat is attached to platform 202 with fasteners, such as nut and bolt assemblies. A person can transfer from a wheelchair to the bucket seat and operate the lift and transport apparatus 200 to locate the bucket seat in the vehicle driver's position or a passenger position. This modification of the lift and transport apparatus 200 assists arthritic and semi-ambulatory persons to enter a vehicle including locating the persons in the vehicle driver's position.

Modifications of structures and arrangement of structures of the lift and transport apparatus can be made by one skilled in the art without departing from the invention as defined by the claims herein.

The invention claimed is:

1. The combination of a motor vehicle having a driver's position, a floor and a door adjacent an outside of the driver's position,
a lift assembly for moving the wheelchair from a first location adjacent the outside of the vehicle adjacent the driver's position to the second location generally above the first location, said lift assembly including an upright first member and an upright second member movably mounted on the first member, a first linear actuator connected to the first and second members operable to selectively raise and lower the second member relative to the first member, means connecting the door to the first member, a platform for supporting the wheelchair, a coupling member secured to the platform and second member adapted to be connected to the wheelchair, a transport assembly connected to the first member for moving the lift assembly and platform from the second location to a third location within the vehicle above the driver's position and for moving the door between open and closed locations, said transport assembly including a first beam and a second beam movably mounted on the first beam for movement between extended and contracted positions, means mounting the first beam on the floor of the vehicle, means securing the second beam to the first member of the lift assembly, a second linear actuator connected to the first and second beams operable to selectively move the second beam between said extended and contracted positions thereby moving the lift assembly and platform from the second location to the third location, anchors located in a fourth location secured to the floor of the vehicle in the driver's position for supporting the platform to locate a wheelchair on the platform in the driver's position of the vehicle, said first actuator being operable to move the platform and door downwardly from the third position to the fourth position, retain the platform in the fourth position and close the door.

2. The combination of claim 1 wherein: the first and second members are first and second tubular members, said first linear actuator being located within and connected to the first and second tubular members.

3. The combination of claim 1 including: a headrest connected to the first member of the lift assembly above and rearwardly of the platform.

4. The combination of claim 1 wherein: the headrest includes a generally horizontal member, means connecting the horizontal member to the first member of the lift assembly, an upright plate connected to the horizontal member, and at least one pad mounted on the plate.

5. The combination of claim 1 wherein: the platform has a plurality of holes accommodating the anchors.

6. The combination of claim 5 wherein: the anchors include upright pins secured to the floor of the vehicle, said pins having upper ends located in said holes and nuts threaded on the pins for supporting the platform.

7. The combination of claim 1 wherein: said coupling member includes a generally horizontal slot and a stop bolt extended through the slot and secured to the coupling member, said stop bolt being operable to limit rearward movement of the wheelchair on the platform.

8. The combination of claim 7 including: an arm secured to the floor of the vehicle engageable by the wheelchair to prevent forward movement of the wheelchair.

9. The combination of claim 1 wherein: said coupling member has a generally horizontal top wall having inwardly converging inside edges providing a generally V-shaped mouth and a linear slot open to the mouth adapted to accommodate anchor bolts attached to the wheelchair, and a stop bolt extended through the slot and secured to the top wall, said stop bolt being engageable with the anchor bolts to limit rearward movement of the wheelchair on the platform.

10. The combination of claim 9 including: an arm secured to the floor of the vehicle engageable with a wheel of the wheelchair to prevent forward movement of the wheelchair in the driver's position of the vehicle.

11. The apparatus of claim 1 wherein: the first and second beams are first and second box beams, said second linear actuator being located within and connected to said first and second box beams.

12. The combination of a motor vehicle having a driver's position, a floor and a door adjacent an outside of the driver's position,
    a lift assembly for moving a wheelchair from a first location adjacent the outside of the vehicle adjacent the driver's position to a second location generally above the first location, said lift assembly including an upright first member and an upright second member movably mounted on the first member, a first linear actuator connected to the first and second members operable to selectively raise and lower the second member relative to the first member, means connecting the door to the first member, a platform for supporting the wheelchair, a coupling member secured to the platform and second member, said coupling member adapted to be connected to the wheelchair, a first stop member mounted on the coupling member operable to prevent rearward movement of the wheelchair, a headrest connected to the first member of the lift assembly above and rearwardly of the platform, a transport assembly connected to the first member for moving the lift assembly, headrest and platform from the second location to a third location within the vehicle above the driver's position and moving the door between open and closed locations, said transport assembly including a first beam and a second beam movably mounted on the first beam for movement between extended and contracted positions, connectors mounting the first beam on the floor of the vehicle, means securing the second beam to the first member of the lift assembly, a second linear actuator connected to the first and second beams operable to selectively move the second beam between said extended and contracted positions thereby moving the lift assembly, headrest and platform from the second location to the third location, anchors located in a fourth location secured to the floor of the vehicle in the driver's position for supporting the platform to locate a wheelchair on the platform in the driver's position of the vehicle, said anchors comprising a plurality of upright pins secured to the floor of the vehicle, said platform having a plurality of holes accommodating the pins to retain the platform in the fourth location and a second stop member connected to the floor of the vehicle engageable by the wheelchair to prevent forward movement of the wheelchair, said first actuator being operable to move the platform and door downwardly from the third position to the fourth position and retain the platform in the fourth position in engagement with the pins and closing the door.

13. The combination of claim 12 wherein: the first and second members are first and second tubular members, said first linear actuator being located within and connected to the first and second tubular members.

14. The combination of claim 12 wherein: the headrest includes a generally horizontal member, means connecting the horizontal member to the first member of the lift assembly, an upright plate connected to the horizontal member, and at least one pad mounted on the plate.

15. The combination of claim 12 wherein: said coupling member includes a generally horizontal slot, said first stop member extended through the slot and secured to the coupling member, operable to limit rearward movement of the wheelchair on the platform.

16. An apparatus for selectively raising and lowering a wheelchair and moving the wheelchair laterally into the driver's position of the motor vehicle having a floor in the driver's position and a door adjacent the side of the driver's position, said apparatus being operable to move the door to open and closed positions comprising:
    a platform for supporting a wheelchair, a lift connected to the platform operable to selectively raise and lower the platform, means for selectively moving the lift and platform laterally to and away from a driver's position of a motor vehicle, a head rest mounted on the lift rearward and above the platform, and a connecting member secured to the lift adapted to be attached to the door whereby the lift and platform move laterally to the driver's position the door moves to a closed position and when the lift and platform move laterally away from the driver's position the door moves to an open position.

17. The apparatus of claim 16 including: a coupling member secured to the platform adapted to be connected to the wheelchair to hold the wheelchair on the platform.

18. The apparatus of claim 17 wherein: said coupling member includes a generally horizontal slot and said apparatus including a stop bolt extended through the slot and secured to the coupling member, said stop bolt being operable to limit rearward movement of the wheelchair on the platform.

19. The apparatus of claim 18 wherein: said coupling member has a generally horizontal top wall having inwardly converging inside edges providing a generally V-shaped mouth and a linear slot open to the mouth adapted to accommodate anchor bolts attached to the wheelchair, and said apparatus including a stop bolt extended through the slot and secured to the top wall, said stop bolt being engageable by the anchor bolts to limit rearward movement of the wheelchair on the platform.

20. The apparatus of claim 16 wherein: the lift includes an upright tubular first member having an upper end and a second tubular member movably mounted on the first member, said second tubular member having a lower end secured to the platform, and a linear actuator connected to the first and second members operable to selectively raise and lower the platform and means connecting the headrest to the upper end of the first member.

21. The apparatus of claim 20 wherein: the linear actuator is located within the tubular first and second members, and means connecting the linear actuator to the first and second members.

22. The apparatus of claim 16 wherein: the headrest includes a member mounting the headrest on the lift.

23. The apparatus of claim 16 wherein: the headrest includes a generally horizontal member, means mounting the horizontal member on the lift, an upright plate connected to the horizontal member, and at least one pad mounted on the plate.

24. The apparatus of claim 23 wherein: a pair of pads are mounted on the plate.

* * * * *